(12) United States Patent
Pham

(10) Patent No.: US 6,382,556 B1
(45) Date of Patent: May 7, 2002

(54) VTOL AIRPLANE WITH ONLY ONE TILTABLE PROP-ROTOR

(76) Inventor: Roger N. C. Pham, 2909 Socrates, Grand Prairie, TX (US) 75052

( * ) Notice: Subject to any disclaimer, the term of this patent is extended or adjusted under 35 U.S.C. 154(b) by 0 days.

(21) Appl. No.: 09/739,095

(22) Filed: Dec. 18, 2000

Related U.S. Application Data

(60) Provisional application No. 60/172,672, filed on Dec. 20, 1999.

(51) Int. Cl.[7] ............................................. B64C 27/22
(52) U.S. Cl. ....................................................... 244/6
(58) Field of Search ........................... 244/6, 7 R, 12.4, 244/17.11

(56) References Cited

U.S. PATENT DOCUMENTS

| | | | | |
|---|---|---|---|---|
| 5,395,073 A | * | 3/1995 | Rutan et al. ................... | 244/38 |
| 5,758,844 A | * | 6/1998 | Cummings ................. | 244/12.4 |
| 5,863,013 A | * | 1/1999 | Schmittle ................. | 244/104 LS |
| 6,065,934 A | * | 5/2000 | Jacot et al. ................ | 244/75 R |
| 6,322,324 B1 | * | 11/2001 | Kennedy et al. ......... | 244/17.13 |

* cited by examiner

*Primary Examiner*—Peter M. Poon
*Assistant Examiner*—Kevin Jakel

(57) ABSTRACT

A VTOL-capable tilt-rotor airplane having a single tiltable large-diameter prop-rotor attached to an elongated power pod containing the collective and cyclical pitch mechanism, transmission, and engine. The tiltable power pod is disposed at the airplane's longitudinal axis and is partially buried within the depth of the fuselage and protrudes 3–4 ft (0.915–1.22 m) above the top of the fuselage in the VTOL mode. In the horizontal cruising mode, the power pod perched on top of the fuselage front section with the rotor blades protruding in front of the airplane's nose. A connecting bar is used to connect the power pod to the fuselage, allowing the power pod to travel significantly rearward and forward as required for proper balance as the power pod pivots 90 degrees during transition from VTOL mode to the cruising mode, without the power pod being excessively long and unwieldy. A small anti-torque rotor toward the tail of the aircraft, driven by a hydraulic motor provides the necessary force to overcome the main rotor's torque. A pair of high-aspect-ratio wings supported by wing struts on both sides of the fuselage provide highly efficient lift during cruising flight with very little induced drag. Conventional horizontal and vertical tail planes are used for directional stability in the cruising mode.

20 Claims, 10 Drawing Sheets

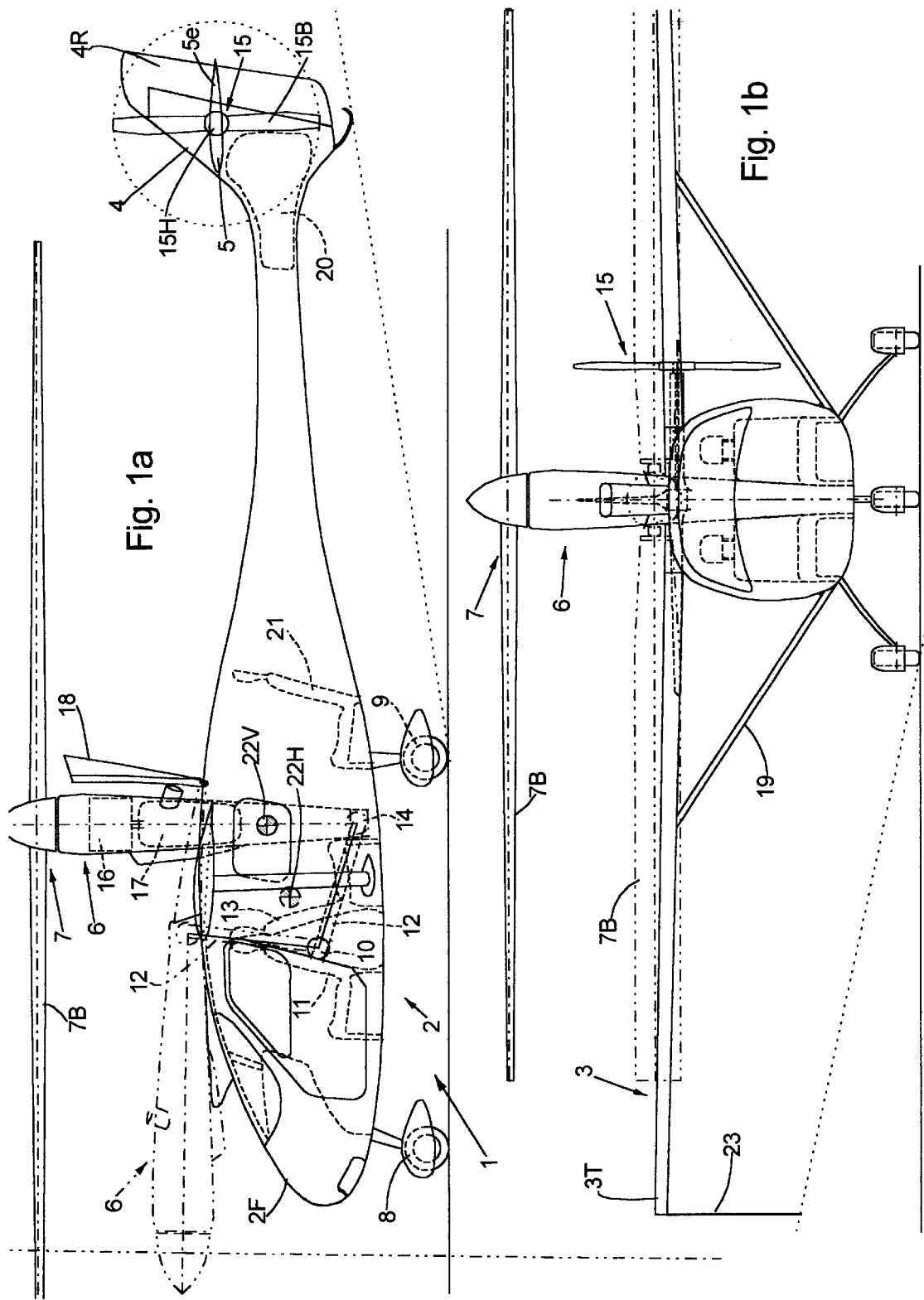

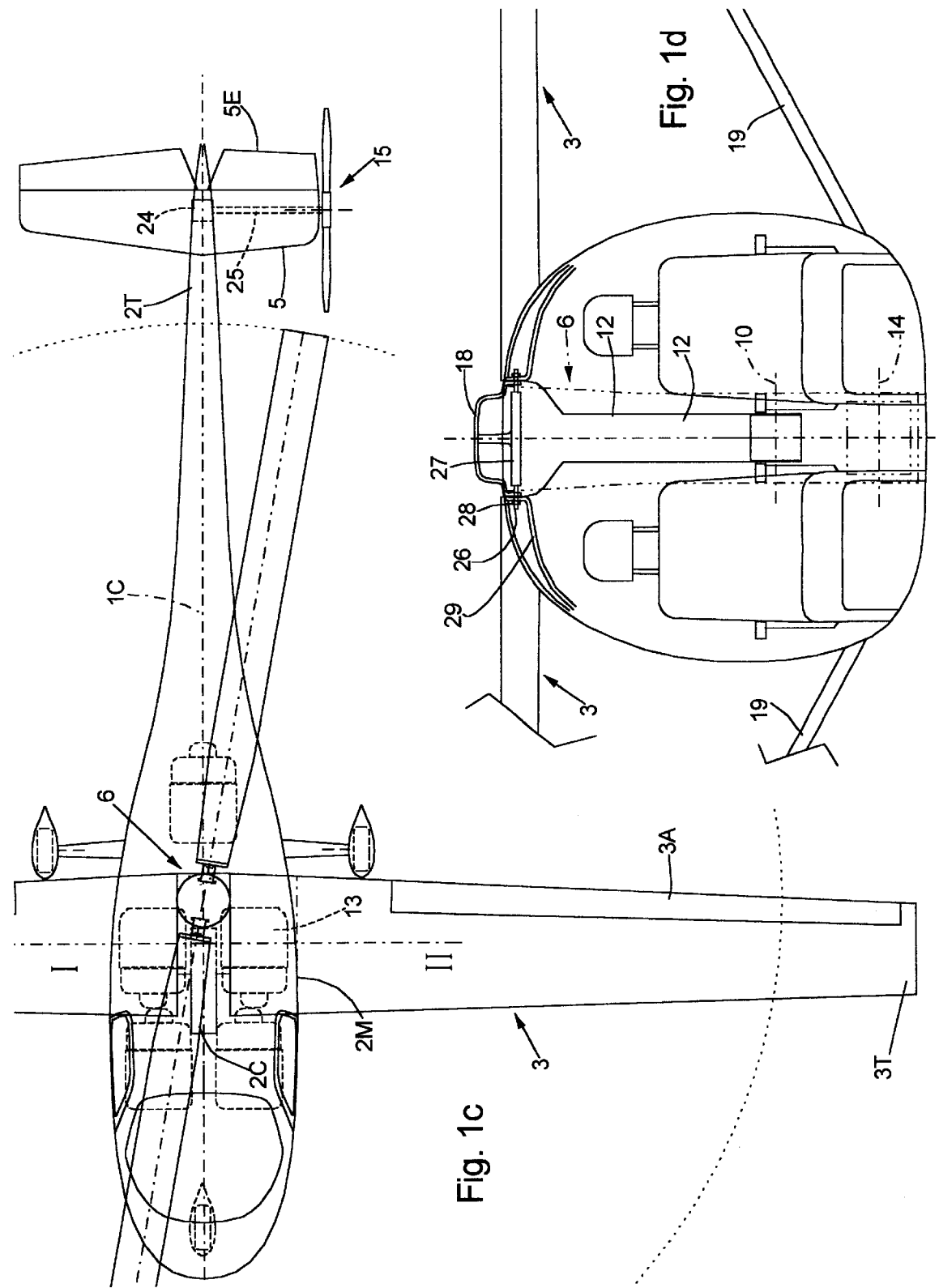

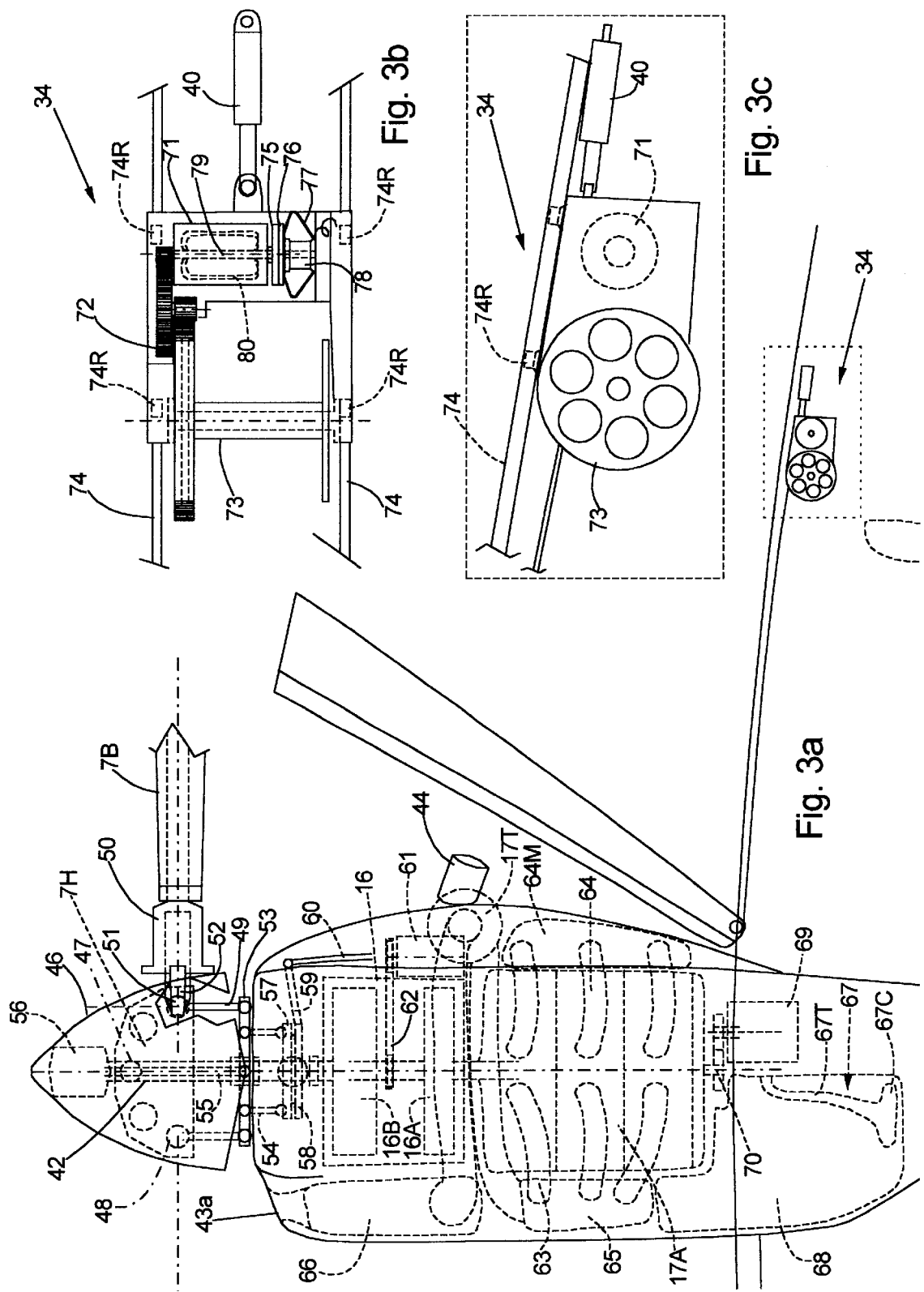

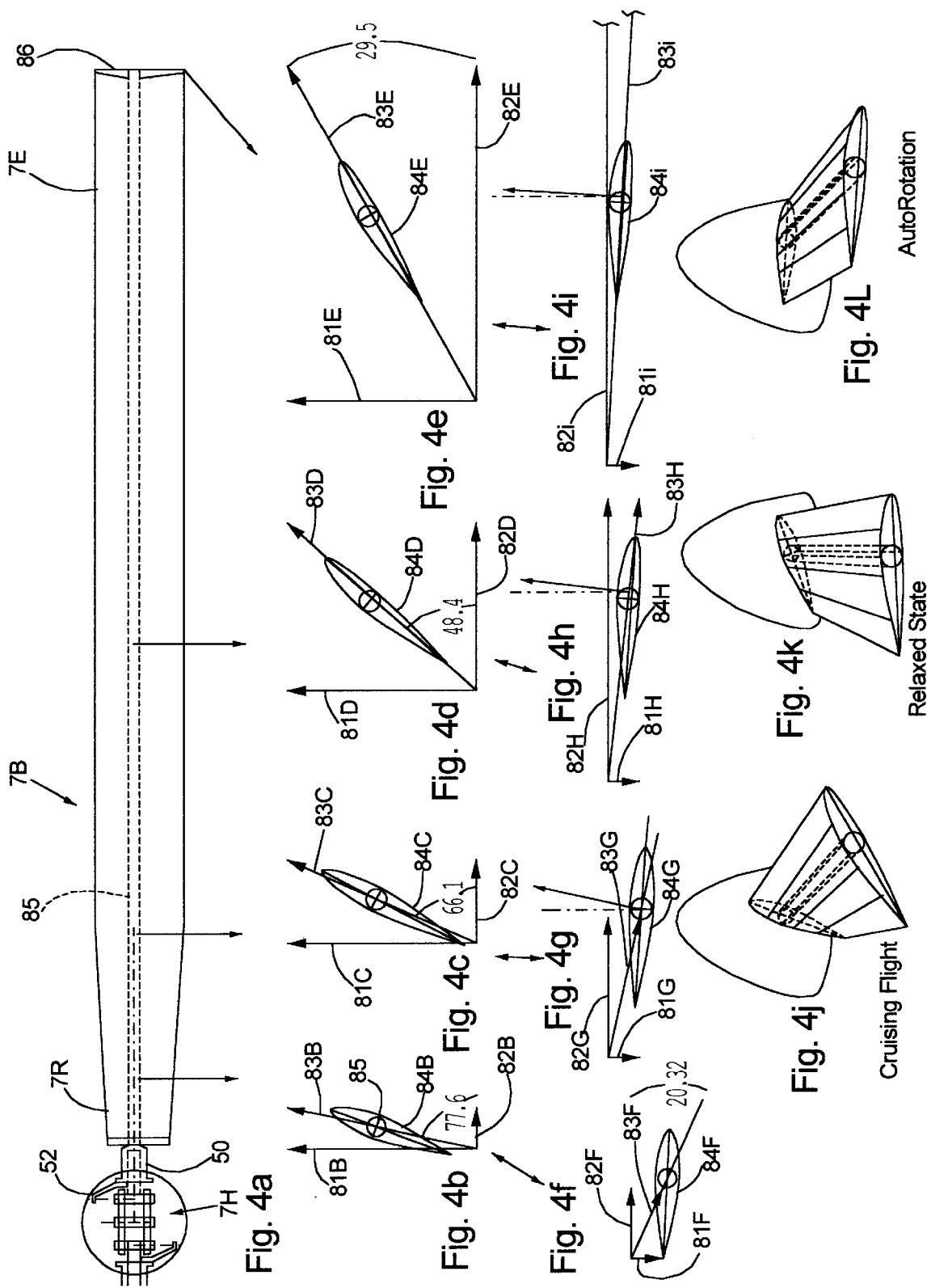

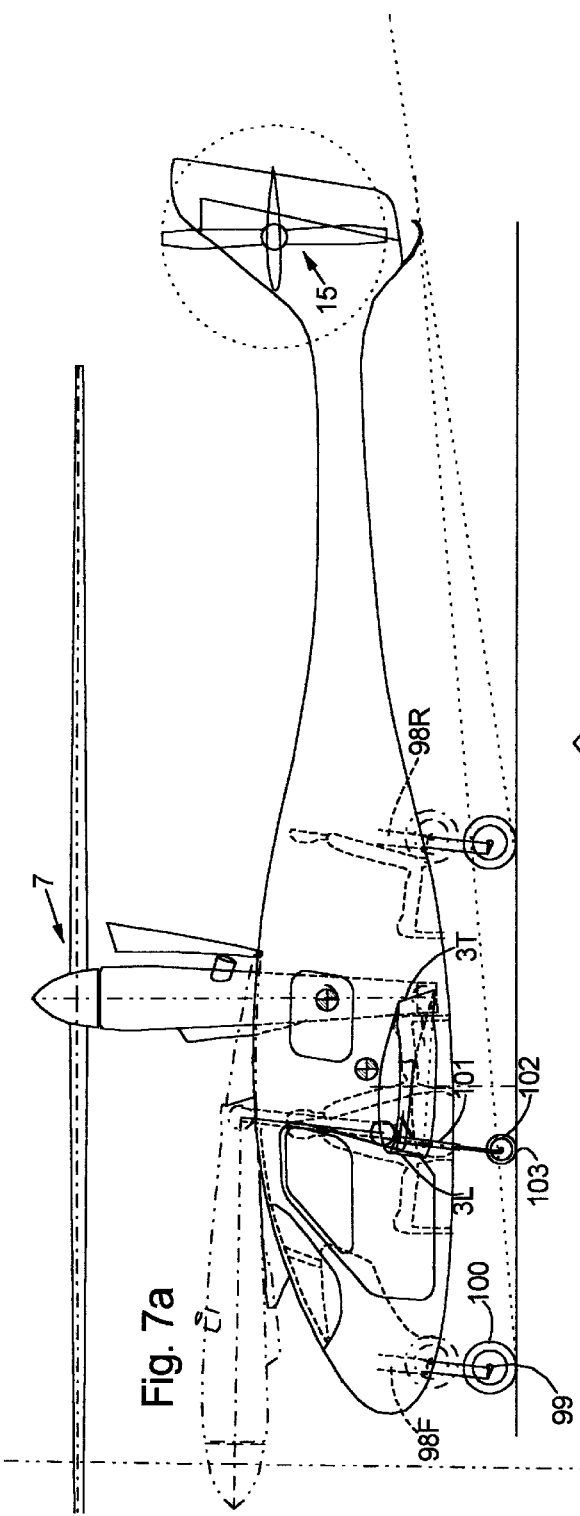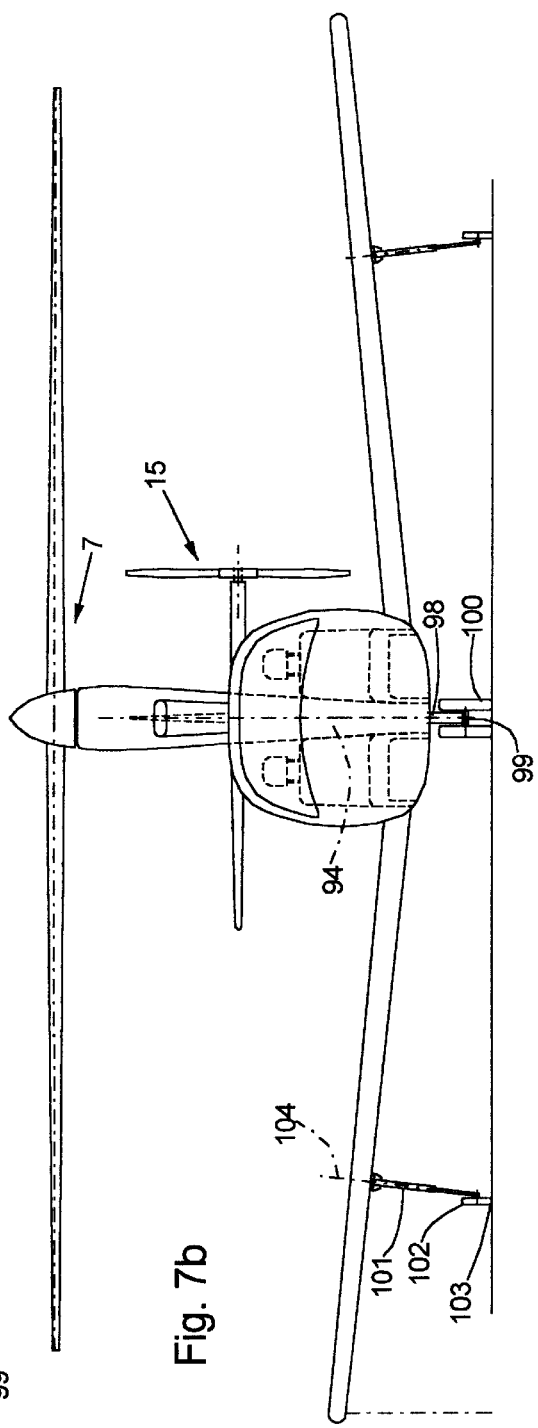
Fig. 7a
Fig. 7b

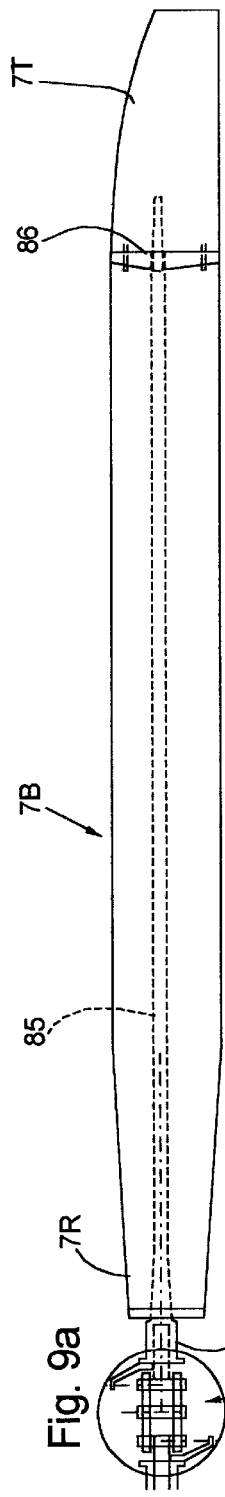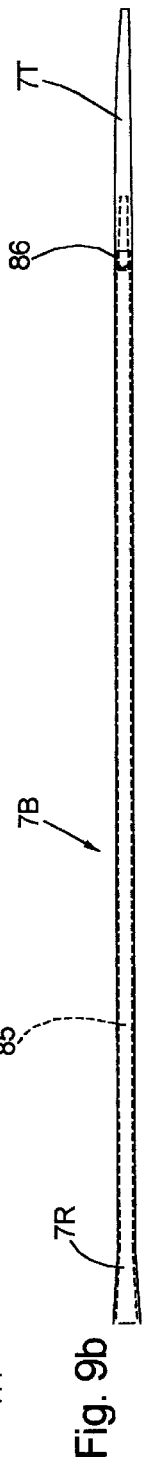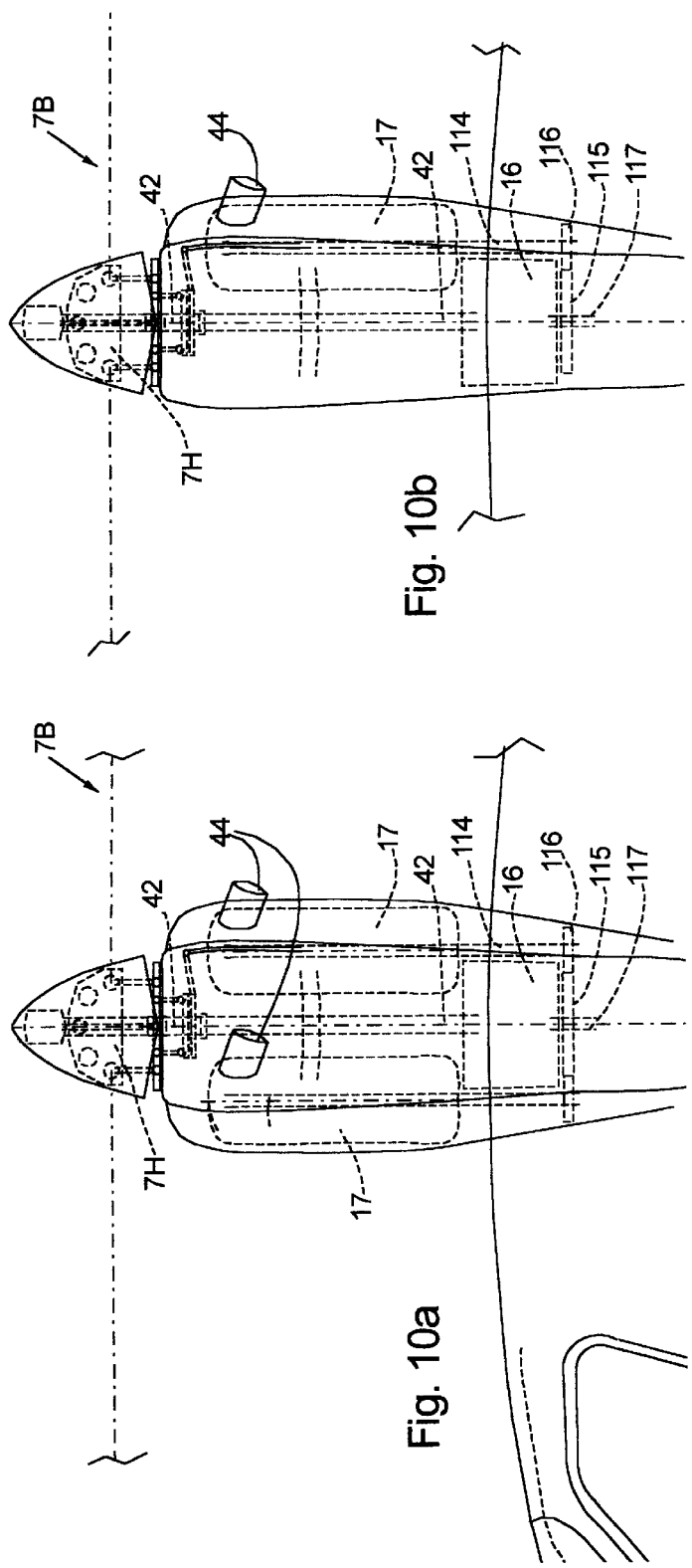
Fig. 9a
Fig. 9b
Fig. 10a
Fig. 10b

VTOL AIRPLANE WITH ONLY ONE TILTABLE PROP-ROTOR

CROSS-REFERENCE TO RELATED APPLICATION

This application claims benefit of Provisional Application Ser. No. 60/172,672 filed on Dec. 20, 1999 entitled "VTOL Convertiplane with only One Tiltable Rotor."

BACKGROUND OF THE INVENTION

1. Field of the Invention

This invention pertains to vertical takeoff and landing (VTOL) airplane. More specifically, it pertains to a type of tilt-rotor VTOL airplane wherein large diameter helicopter-type of rotor is used for vertical lift, and which may be tilted 90 degrees forward to provide horizontal thrust during cruising flight when the aircraft is supported by conventional wings. In this invention, there is only one large tiltable rotor mounted on top of the aircraft fuselage at the aircraft longitudinal axis to provide both vertical lift when the rotor is pointed upward and horizontal thrust when the rotor is pointed 90 degrees horizontal.

2. Discussion of the Prior Art

Shortly after the airplane was invented, its disadvantage of requirement of a significant runway for takeoff and landing was quickly noticed, which significantly limit the airplane's utility. The helicopter was introduced afterward in order to overcome the limitation of the airplane. However, the helicopter has not received wide spread use but only in special roles that strictly require VTOL capability, and the helicopter numbers is but $\frac{1}{10}$ that of the airplane. The helicopter flies too slowly and too inefficiently, with speed and range $\frac{1}{2}$ to $\frac{1}{3}$ that of the airplane, with 2 to 3 times the fuel consumption and cost of operation per passenger-mile. The helicopter is far less safe per passenger-mile basis. According to NTSB statistics, the fatality rates for piston helicopters is 3–4/100,000 hrs and for light turbine helicopters 2–3/100,000 hrs where as the rates for a typical high wing airplane such Cessna 172 is 0.5 and Cessna 182 is 0.7/100,000 hrs. Light turbine helicopters have purchasing cost 2–4 times that of comparable piston airplane, but recently, the Robinson piston helicopters with their simplified rotor head design has brought down their purchasing cost to a level comparable with piston airplane.

In order to maintain the VTOL advantage of the helicopter while overcoming the helicopter's inefficiency, there have been at least 50 different projects experimenting with high-speed VTOL aircraft by a large numbers of well known aerospace companies, proposing at least 12 different configurations in the last five decades. See, for example, "An Introduction to V/STOL Airplanes" by Iowa State University Press, 1981. Today, there is only one VTOL transport airplane that has sufficient merits to achieve production status, the tilt-rotor Bell-Boeing V-22 Osprey, after 40 years of experimentation, 40 billion dollars spent, and intense congressional lobbying effort after repeated congressional attempts to cancel the program, due to huge cost over-run, weight increase and increase in complexity. The V-22, with a pair of tiltable rotors mounted on each wing tips, is so expensive and complex that it cannot replace conventional high-lift helicopter such as the Boeing Chinook CH-47D with twice the payload at $\frac{1}{2}$ the cost, nor can it be cost-competitive with the Sikorsky UH-60L Black Hawk single rotor helicopter with $\frac{3}{4}$ of the useful vertical load capacity at a small fraction of the purchasing cost. The civilian derivative of the V-22 is the Bell-Agusta BA-609 tilt-rotor having less load capacity as compared to a LearJet 45 yet costing twice as much, and flies at $\frac{3}{5}$ the speed of the LearJet 45 with half the range.

There are many obvious reasons for the high cost of the tilt-rotor VTOL airplane. Current tilt-rotor VTOL airplane requires two large helicopter-type of rotors, which are expensive to make due to their complexity in incorporating flapping rotor blade design, complex linkage for combining cyclical pitch control together with collective pitch control. The requirement of two large rotors significantly increases the cost of the aircraft over that of a single-rotor heavy-lift helicopter. Mounting those two rotors at the wing tips means that a significant degree of thrust asymmetry exists should one engine fails, thus necessitating complex transmission mechanism connecting the two rotors together. Since the two rotors are very large, they produce significant degree of vibration necessitating rigid wing construction with expensive materials further increasing the cost. In term of safety, a twin tiltable-rotor VTOL airplane cannot be as safe as a single tiltable rotor design, because a twin rotor design will have twice the risk of a one-sided rotor/transmission/control mechanism failure, which would be fatal. Even in the absence of mechanical failure, a sudden reduction in lift of one rotor with respect to the other can lead the aircraft to flip over and out of control. This can happen due to vortex-ring effect or power settling when descending too rapidly in the hovering mode or upon turbulence. Attempting to increase lift by increasing throttle and pitch will only worsen the problem. This is what was blamed for the crash of the Marine MV-22 in Apr. 8, 2000, wherein a tight turn to the right at high rate of vertical descent at low airspeed causing the right rotor to lose lift, leading to a roll to the right. The pilot applied more power and collective pitch to the right rotor as correction only worsen the problem, causing the airplane to roll over and crash. Power settling in a single-rotor helicopter usually does not lead to a crash because no asymmetrical lift is involved, only a high sink rate at high power. The pilot simply increases the forward speed to overcome the problem. For all the above reasons, the vast majority of current helicopters now have a single centrally-mounted main rotor, even for very large helicopters, as opposed to multiple rotor designs that originated since the days that the first rotary wing aircraft were invented.

Another disadvantage of a twin-tilt-rotor airplane would be the necessity of using computer stability augmentation system in the VTOL mode, due to the very large roll and yaw moment of inertia with the engines and rotors mounted at the wing tips, and also due to the low cyclical pitch control moment of the smaller size rotors. This requires a fly-by-wire system with triple redundancy system which would be very expensive for a smaller size aircraft, and a digital flight control system has been known to be vulnerable to electromagnetic interference, system conflicts and crashing, and other factors making it unreliable in actual practice. By contrast, a single rotor helicopter due to its large diameter thus more dynamic stability, can be controlled by a trained pilot without requiring stability augmentation system, thus has been proven to be much cheaper and more reliable.

Clearly, the VTOL tilt-rotor airplane, the most successful VTOL airplane configuration, must be designed with a single main lifting rotor in order to be simpler, cheaper and safer than current twin wing-mounted tilt-rotor design. It is only then that the VTOL airplane can make a significant impact on commercial air transportation, thereby reducing the problem of airport congestion at large commercial airport and increasing rate of closure of small airports due to local political pressure favoring real-estate developers.

To my knowledge, there has not been any disclosure of a tilt-rotor VTOL airplane utilizing a single tiltable rotor. A related U.S. Pat. No. 5,395,073 by Rutan et. al discloses a drone type of aircraft with a propeller mounted in front of a fuselage, a pair of "free wings" mounted on both sides of the fuselage, and tail booms attached to the wings for supporting the tail surfaces. The entire fuselage is pivotable transversely with respect to the wings and the tail surfaces. When the fuselage points upward, the front-mounted propeller is then pointed upward in the take off and landing phase thus providing vertical lift. After takeoff, the fuselage is pivoted to its horizontal orientation to provide horizontal thrust for cruising flight. The wings and the tail are always maintained in parallel with the direction of travel. Rutan's design is intended primarily for a robotic drone aircraft, therefore its design is not suitable for a human piloted aircraft in which the fuselage cannot point upward or the pilot will be disoriented in the most critical VTOL mode when the pilot's head is pointed upward. Furthermore, the pilot, when sit facing upward, will not be able to see the ground adequately for take off nor for landing. Rutan's design is more suitable for STOL (short take off landing) rather than VTOL since it has less than adequate provision for stability control in the VTOL mode. Its suggestion of aerodynamic vanes placed below (or behind) the propeller for VTOL stability control is not well-proven in actual practice, and even if this is sufficient, it would make for a very twitchy system necessitating computer stability augmentation system with all associated disadvantages.

SUMMARY AND OBJECTIVE OF THE INVENTION

It is an object of this invention to provide a high performance VTOL airplane with purchasing cost and operating cost competitive with that of a conventional airplane of comparable load capacity.

It is another object of this invention to provide a high performance VTOL airplane with a single tiltable rotor that is safer than either a comparable helicopter or a twin-tilt-rotor airplane.

It is yet another object of this invention to disclose a rotary wing aircraft that is much more resistant to dynamic roll-over or to flipping over.

It is yet another object of this invention to disclose an unique type of rotor blade design that is capable of varying the twist angle from the blade tip to the blade root, depending on the flight mode, thereby maintaining very efficient cruise performance while allowing a 20% gain in vertical rotor lift over that of rotor blade with fixed tip-to-root twist, and permitting efficient autorotation allowing the use of a single engine thereby greatly reducing cost.

Further objects and advantages of this invention will become apparent after a consideration of the drawings and the ensuing description.

In summary, in order to achieve all of the forestated objectives, the VTOL airplane of this invention has a single tiltable main rotor attached to an elongated power pod containing the collective and cyclical pitch mechanism, transmission, and engine. The power pod is partially buried within the depth of the fuselage and protrudes 3–4 ft (0.915–1.22 m) above the top of the fuselage in the VTOL mode. In the horizontal cruising mode, the power pod perches on top of the fuselage front section. A connecting bar is used to connect the power pod to the fuselage, allowing the power pod to travel significantly rearward and forward as required for proper balance as the power pod pivots 90 degrees during transition from VTOL mode to the cruising mode, without the power pod being excessively long and unwieldy. A small anti-torque rotor toward the tail of the aircraft, driven by a hydraulic motor provides the necessary force to overcome the main rotor's torque. A pair of high-aspect-ratio wings supported by wing struts on both sides of the fuselage provide highly efficient lift during cruising flight with very little induced drag. Conventional horizontal and vertical tail planes are used for directional stability in the cruising mode.

BRIEF DESCRIPTION OF THE DRAWINGS

FIGS. 1a and 1b show a side view and front view, respectively, of this VTOL airplane, showing general layout.

FIG. 1c is a top-down plan view of this VTOL airplane, and

FIG. 1d is a close up frontal view of the aircraft showing the power pod and connecting bar pivoting mechanism.

FIG. 3a is a close up view of internal layout of the power pod utilizing a 3-rotor rotary engine, transmission and pitch control mechanism.

FIGS. 3b and 3c show top down view and side view of the power winch for power pod tilting.

FIGS. 4a to FIG. 4L reveal rationale for the variable twist rotor blade design.

FIGS. 7a and 7b show an alternate version of the VTOL airplane with cantilever low wing and retractable landing gears with maximum shock absorption and ground stability for handling by the novice pilot.

FIGS. 9a and 9b show an alternate variable-twist rotor rotor blade design with scimitar shape tip and increase torsional stiffness.

FIGS. 10a and 10b show alternative turbine engine arrangement accompanying twin engine and single engine installation.

DETAILED DESCRIPTION OF THE PREFERRED EMBODIMENT

OVERVIEW

Figure 2:
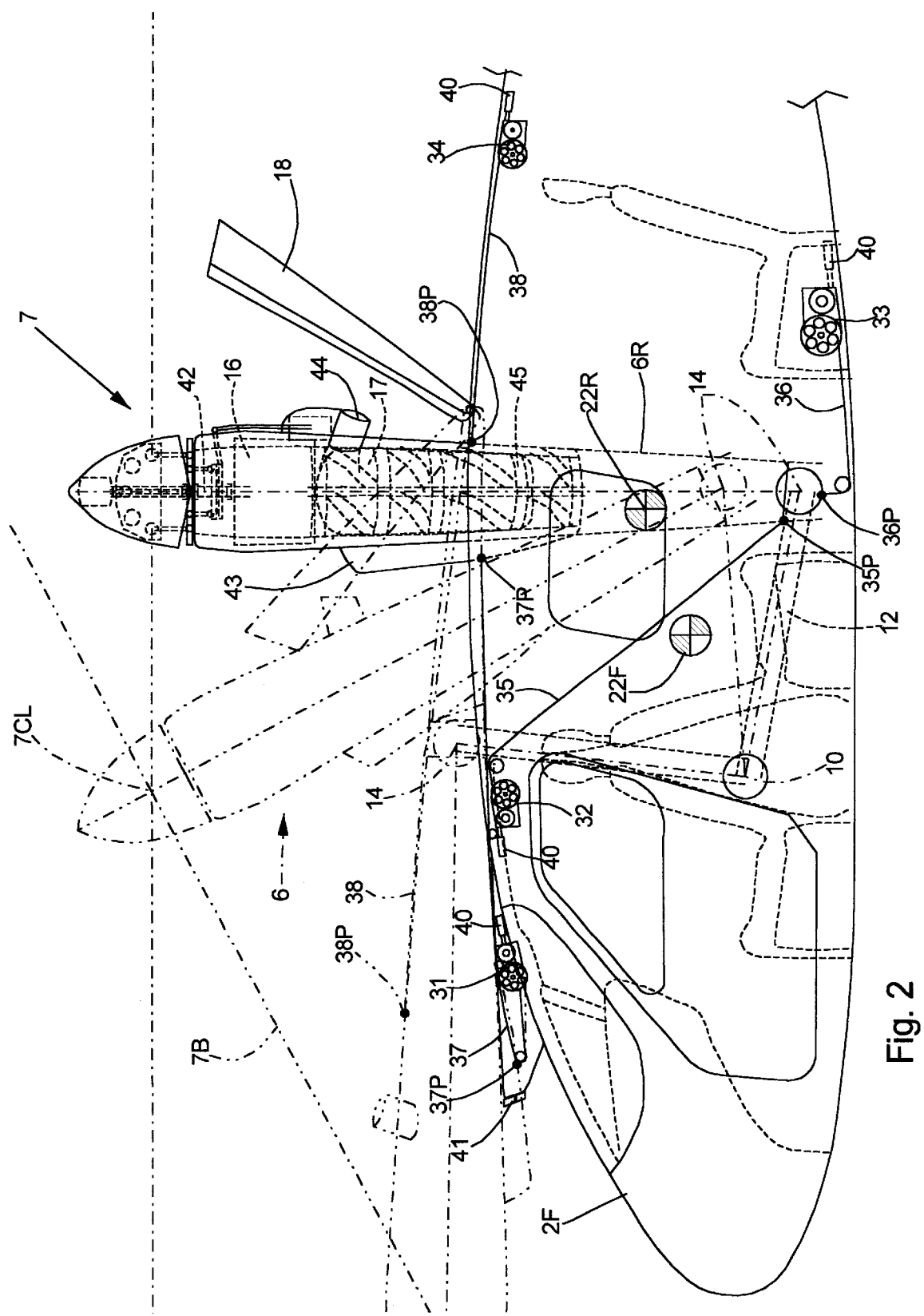
FIG. 2 is a dose up side view of the aircrafts power pod pivoting mechanism using power winches.

Referring to FIG. 1a there is shown a 5–6-seat tilt-rotor airplane designated in its entirety by reference numeral 1, with a fuselage 2, a pair of wings 3, tri-cycle landing gears with a front wheel 8 and a pair of rear main wheels 9, vertical fin 4 with rudder 4R, and a horizontal stabilizer 5 with elevator 5E as in conventional airplane arrangement. For maximum visibility toward the ground, a high wing configuration supported by wing struts 19 is selected. For motive power, there is a single power pod 6 containing engine 17 directly connected to transmission 16 turning a helicopter-style main prop-rotor 7 mounted on top of power pod 6 for vertical lift. Main prop-rotor 7 is tiltable around tilting axis 10 disposed on the longitudinal axis of the convertiplane right behind front seats 11. Tilting axis 10 is formed with a connecting bar 12 pivotably attached to the fuselage via an attachment rod serving as pivoting axis. Tilting of rotor 7 is from a vertically oriented position for vertical take off, vertical landing or hovering, to a horizontally forwardly oriented direction for providing forward thrust during crusing flight. Rotor 7 is also tiltable 5–7 degrees past vertical toward the rear for use in autorotation or to back up the vehicle during taxiing. The power pod 6 is linked to the tilting axis 10 via connecting bar 12, serving also as translational means for moving the main prop-rotor with respect to the fuselage with a fore-and-aft vector component along the longitudinal axis of the fuselage, therefore allowing the power pod 6 to be substantially forward for proper propeller clearance with respect to the fuselage's front end 2F, resting on top of the fuselage in the horizontal orientation, and yet allowing the power pod 6 to be moved significantly rearward and is partially burried inside the entire depth of fuselage 2 on the midline between a pair of middle seats 13 in the vertical orientation. This minimizes the vertical height of the rotor 7 with respect to the fuselage hence reducing the risk of tipping-over when parking on the ground or during vertical transition from the ground into the air. The rearward location of the prop-rotor in the vertical orientation is necessary for proper balancing of lift vector at the VTOL-mode center of gravity (CG) 22V. Please note that in the horizontal cruising mode when the power pod is moved to the front, the horizontal-cruise CG 22H also moves significantly forward due to the substantial weight of the power pod and of the rotor up front. The power pod 6 is also pivotable with respect to connecting bar 12 on pivoting axis 14, allowing the power pod 6 and the prop-rotor 7 to be freely pivotable at one spot without translational fore and aft movement that would have resulted when the entire connecting bar and power pod assembly is pivoted at the fuselage attachment rod. This allows a larger portion of the power pod to be submerged within the depth of the fuselage thus more stability than if the entire connecting bar and power pod assembly is to be pivoted at tilting axis 10. Mechanism and motive means for the tilting action of connecting bar 12 and the pivoting action of power pod 6 will subsequently discussed. Fairing hatch 18 is needed to provide aerodynamic fairing aft of power pod 6 in the horizontal position, and to cover up the opening in the top of the fuselage that makes possible movement of power pod 6. After landing of the aircraft when the rotor has stopped turning, the power pod may be tilted horizontally again, with the rotor blades locked in the horizontal position for ground clearance, referring to FIG. 1b, thereby allowing the fairing hatch 18 to close up the top of the fuselage to avoid accumulation of dirt or rain water when parked. Connecting bar 12 and pivoting axis 14 must be very strong to the withstand the huge torque generated by power pod for spinning the rotor 7. For the same reason, an anti-torque rotor 15, disposed at the tail end of the aircraft, is necessary to counteract the main rotor's torque. Unlike the anti-torque rotor of a conventional helicopter having blade flapping mechanism and lead-lag hinge, the anti-torque rotor 15 of this single tilt-rotor airplane is far simpler and far more sturdy, having a simple rigid-hub similar to the airplane's variable pitch propeller hub. Anti-torque rotor 15 is comprised of a rigid hub 15H whereby rotatably attached rigid blades 15B of the same design as a typical airplane's propeller except that the blades 15b have little blade twist from the hub to the tip. In operation, the pitch of the blades 15B is made variable for control of the yaw axis during the hovering mode. With increase in forward speed, the vertical fin 4 of the aircraft is increasingly more effective in overcoming the main rotor's torque, especially with the rudder 4R trimmed toward the left side acting as flap thus increasing the lift coefficient of the vertical fin 4. Thus, with increase in forward speed, less force is needed of the anti-torque rotor 15, hence the pitch angle of the blades 15B is accordingly reduced, thereby reducing the asymmetrical rolling forces from the non-flapping tail rotor 15 as the result of forward airspeed. When a speed is reach in which the vertical fin 4 can entirely compensate for the torque of the main rotor 7 with safety margin against stalling of the vertical fin, the pitch on the rotor blades 15B is reduced to zero and with higher airspeed, the rotation of the rotor blades 15 can be stopped altogether, thus conserving energy and eliminate wear on the tail rotor system 15 during normal cruising flight. The small size of the tail rotor 15 and the rigid construction ensure that it will not receive significant stress when stopped rotating in high speed forward flight. Due to the tiltable nature of the power pod 6, a direct mechanical link between the main rotors transmission 16 and tail rotor 15 is not practical, necessitating a fluid-type of power transmission such as a hydraulic pump driving a hydraulic motor directly turning the tail rotor 15 without gear reduction. Alternatively, if one wishes to avoid the complexity and maintenance problem of a hydraulic system and if prolonged hovering is not required, the tail rotor 15 may powered by a geared electric motor (not shown) drawing currents from a designated high performance onboard battery which will be recharged during flight or during engine warm-up.

A sitting capacity of 5–6 is preferable based upon the popularity of this size of commercial helicopters. This required 3 rows of seats, with the middle row 13 faces rearward while the last row 21 faces forward allowing a single door to be used for entry into the second and third row of seats. To compensate for considerable change in the VTOL-mode center of gravity 22V position due to uneven loading of the passengers, a ballast tank 20 is desirable in the tail end of the vehicle. For convenience, this may contain reserve fuel capacity that may be shuffled back and forth from a pair of fuel tanks in the wing to the tail. In the event that the reserve fuel is used up, the aircraft will be nose-heavy but should still be controllable. If safety against fire harzard is a more important consideration, then ballast tank 20 may contain water that may be filled up or drained as necessary. For more convenience, another water tank in the nose section of the fuselage may be used for shuffling the water between the nose and the tail end, allowing for optimum balance of the aircraft under most loading condition.

Referring to FIG. 1b, which is a front view of the tilt-rotor plane, the positions of the wing strut 19, the power pod 6, and tail rotor 15 are confirmed. When parked, the power pod 6 may be positioned horizontally where the main rotor blade 7B is being locked in the horizontal position, allowing top hatch 18 to be closed against the roof of the fuselage thus preventing rain and dirt from entering the fuselage. To isolate the cabin from the outside air draft during the take-off, landing or hovering phase, a wall structure (not shown) may be provided to seal off the cabin from the clearance space inside the fuselage required for the travel of the power pod 6. At each wing tip 3T, a wing skid 23 of considerable length is provided to prevent dynamic rollover of the tilt-rotor plane. Wing skid 23 may be made from resilient material such as nylon, fiberglass or steel, and may be retractable upward and rearward during flight if desirable. Dynamic rollover in a helicopter happens when significant thrust is developed by the rotor and the rotor mast is tilted significantly before the helicopter lifts off the ground, producing a strong sideway acceleration from the top of the rotor mast that is resisted by the landing gear on the bottom, thus creating a very strong sideway rolling moment that is beyond the cyclical pitch control's authority of the helicopter. Due to the long span of the wing 3 and the soft resilient nature of wing skid 23, the dynamic rollover can be gently arrrested while giving the pilot time to reduce collective pitch while applying cyclical pitch in the opposite direction to level the aircraft. Dynamic rollover happens quite frequently in helicopters during strong cross wind, in uneven terrain or in the hand of inexperienced pilot, and although nonfatal, it can be very expensive because the rotor and the transmission is ruined, forcing higher hull-damage insurance rates thus increasing the cost of operation for rotary wing aircraft.

FIG. 1c is a top plan view of the tilt-rotor airplane, showing its high aspect-ratio wings and the ailerons 3a, seating arrangement and the tail rotor layout. The ailerons 3a may also be used as flaps, or flaperons during the vertical take off phase or short take off phase in order to minimize the aerodynamic drags of the wing on the main rotor's down draft hence reducing loss in rotor's lift. The tail rotor unit 15 is shown mounted to the tip of the horizontal stabilizer powered by a hydraulic motor 24 disposed at of the fuselage's tail end 2T. A drive shaft 25 connects the tail rotor 15 to the hydraulic motor 24. Because the power pod 6 protrudes through the center line 1c of the middle portion of the fuselage, the two middle row seats 13 must be separated by a channel 2C in order for the connection bar 12 to traverse through. Channel 2C needs not be wide, as the connecting bar 12 can be as little as 6-inch wide and still can provide sufficient resistance to torque from the main rotor due to its strong I-beam construction. FIG. 1d is a cross-sectional view of the fuselage mid-section 2M cut along line I-II as viewed from the rear, showing the relative vertical positions of tilting axis 10, of connection bar 12 when the power pod 6 is in the horizontal position, and the alternative position of the power pod 6 and its pivoting axis 14 when the power pod 6 is in the vertical position. Notice that the power pod 6 is much wider than the connecting bar 12, but the power pod 6 only takes up space at the occupant's legs and not the occupant's arm or shoulder space, which require more width than the leg's space. As power pod 6 rotates upward, it takes up some of the width of the occupant's head room, but this is of little significant because of the tall ceiling and that the head room requires less width than shoulder room. The top portion of FIG. 1d shows a cross section of the hatch 18 in the closed position as when the power pod is in horizital position. To restore integrity to the fuselage strength that is compromised due to the large opening in the roof top, a pair of motor-driven bolts 26 receiving rotational torque from the bolt motor housing 27 in order to threadedly bolted to each nut 28 attached to each structural flange 29 on the fuselage top. In operation, as the hatch 18 is closed shut, the bolts 26 will be driven into the nuts 28 thereby providing compressional resistance to the top of the fuselage for the wing 3 as supported by wing struts 19, and providing tensional resistance to the fuselage if cabin pressurization is chosen. The bolt motor housing 27 may be constructed by any suitable means in the art for example similar to a typical powered screw driver. If cabin pressurization is not chosen, then, motor-driven bolt 26 may not be necessary, as the roof top of the fuselage may simply be strengthened to accept the compression and tension force from the strut-braced wing 3.

Power Pod Tilting Mechanism

FIG. 2 shows an example of a possible layout for power actuation of the tilting and pivoting of the power pod 6. As mentioned, power pod 6 is tiltable from a horizontal position to a vertical position on axis 10 via connecting bar 12. Power pod 6 is also pivotable on axis 14 for changing its thrust angle during various phase of flight. For example, an alternative position of power pod would be forward tilt at about 25 degrees for short take off and landing at greater gross weight rating than possible with vertical take off. Furthermore, with the power pod in the 90-degree vertical position, the convertiplane cannot climb well at optimal forward speed for maximal climb rate because then the wing would be at a low to negative lift angle when the tilt-rotor plane is canted forward to obtain forward thrust. Raising the nose of the aircraft in order to position the wing at favorable angle of attack would point the main rotor 7 rearward thus destroy necessary forward thrust. By tilting the power pod at 30–40 degree angle with respect to the fuselage, the aircraft may be angled upward 20–25 degrees and still receive adequate forward thrust from the main rotor which is now canted forward at about 10–15 degree angle. Thus as the aircraft travels forward at about 60–70 mph (96–112 kph) which is the optimum speed for most efficient main rotor translational lift, it also receives a significant proportion of its lift from the wing. When combining the two sources of lift, the aircraft can achieve higher climb rate for a given amount of horse power, or can tolerate greater gross weight rating in the short take off mode than in the vertical take off mode. This is possible because for a typical small aircraft such as the Cessna 182S or a typical helicopter such the Bell 206 Jet Ranger III, only 40% of the engine's maximum shaft horsepower goes directly toward producing the energy required for maximum climb rate, while the rest of the power is wasted in overcoming aerodynamic drags. A more efficient lifting system that allows the aircraft to achieve its maximum climb at lower airspeed, hence less aerodynamic drags, and with very efficient thrust production at low airspeed, can convert more of the engine horsepower into climb rate. The high aspect ratio wing of this convertiplane is a far more efficient lifting device than a typical helicopter's rotor blades, and the huge propeller (main rotor) of this convertiplane is also far more efficient at producing thrust at low airspeed in comparison to the Cessna's propeller. As shown, the power pod 6 is moved by means of pull—pull cables system powered by four power winches, 31, 32, 33, and 34. The winches 32 and 33 are responsible for tilting action of power pod 6 along axis 10 via cables 35 and 36 respectively. Cable 35 originates from winch 32 and is attached to point 35P at the end of power pod 6. Cable 36 originates from winch 33 and is also attached to the end of power pod via point 36P. Winch 33 and corresponding cable 36 must carry almost the entire weight of the tilt-rotor plane (minus the weight of the power pod 6 and main rotor 7), hence, they must be of larger size than the rest of the winches and cables. Winches 31 and 34 are responsible for pivoting action of power pod around axis 14 via cables 37 and 38 respectively. Cable 37 originates from power winch 31 located at the front portion of the fuselage and is attached to a point 37P half way along the length of power pod 6 at its front aspect. Cable 38 originates from winch 34 located right behind the cabin section and is attached to point 38P also halfway along the length of power pod 6 at its rear aspect. Pivoting action of the power pod 6 allows for combination of significant forward thrust and upward lift by the main rotor 7. Notice that with significant forward pivoting of power pod 6 on axis 14, clearance space for the rotor blade 7B with respect to the front section of the fuselage 2F is very much reduced, such that the rotor blade 7B can strike the front fuselage section 2F within its range of downward flapping motion. To increase this clearance space, it is necessary to tilt the power pod 6 upward on axis 10 a necessary amount simultaneously with forward pivoting of the power pod 6, and this mixing can be preprogrammed in the electrical control circuitry. Within axes 10 and 14, there are provided position sensing devices (not shown) such as potentiometers that can relay these informations back to the electrical control circuitry for accurate control of both actions. Because both tilting action and pivoting action are mixed, there need be only a single control function in the cockpit for the pilot, in order to decrease the pilot's workload. The large range of travel of power pod 6 creates a large shift in center of gravity (CG) of the aircraft, with the rear CG position 22V when the power pod is vertically oriented and the front CG position 22H when the power pod is in the forward horizontal position. The location of the wing 3 must be made with respect to the forward CG position 22H. A potential problem exist when the power pod 6 is tilted half way forward thus significantly moving the main rotor's center of lift 7CL well forward of both CG positions thereby creating a strong upward pitching moment for the aircraft. At the same time, the high location of the main rotor's center of lift 7CL also create a downward pitching moment that can partially balance out the upward pitching moment as mentioned. The horizontal tail 5 with the elevator 5E and the cyclical pitch control authority of the main rotor 7 can then provide the rest of the balancing force in order to keep the aircraft under control. To protect the gear mechanism of the power winches from sudden shocks and to prevent destructive resonance resulting from elasticity of the winch cables, spring-loaded hydraulic suspension-dampers 40 are used to link the power winches to the fuselage structure. The power winches are free to slide on rails, with details to be shown in FIG. 3b and FIG. 3c. Of course, during horizontal cruising flight, which makes up 98% of the time, the power winches receive no stress because the power pod 6 is firmly secured against the front section of the fuselage 2F by latch 41. Latch 41 may utilize any suitable mechanism well know in the art, for example, that of the automobile hood or trunk lid, which allows automatic locking upon contact of sufficient force, and release mechanism may be by spring-loaded cable means actuated inside the cockpit, or by electromagnetic means locally actuated.

Power Winch Details

Referring to FIG. 3b and FIG. 3c, there is shown detailed mechanism of the power winches 31–34. An electric motor 71 provides power to several stages of reduction gears 72 at one end of the motor 71, leading to a large reel 73 to provide traction for the cables 35, 37, 36, or 38. At another end of motor 71 there is a disc 75 attached to the motor's shaft 79 for locking the rotation of the motor's shaft 79 when the power winch is not energized. Disc 75 has teeth on its external surface for locking contact onto another concentric disc 76 with corresponding teeth pattern when the two discs 75 and 76 are maintained in contact by springs 77. To break contact between disc 75 and disc 76, a solonoid 78 is used, which is energized miliseconds before the motor 71 is energized, thereby pulling disc 76 against springs 77 away from disc 75, allowing the motor 71 to turn. Toward the rear end of each power winch is a spring loaded hydraulic suspension-damper 40 as discussed. The power winch units 31–34 are mounted in rails 74 allowing freedom to slide only in the foreaft directions. In operation, the motors 71 of both the reeling and the releasing winches must be unlocked in order to allow power pod 6 to tilt or to pivot. However, only the motor of the reeling power winch needs be energized. The motor of the releasing winch is not energized, thereby creating drags on the cables thus providing necessary tension on the cables. An electric motor with strong permanent magnetic field and an iron-core windings 80 tends to create strong drags when being rotated by external force. If this drag is too strong, a weak current may be fed to the releasing winch motor during movement thereby reducing resistance to a desirable level for proper tensioning of the cables.

Power Plant

Also shown in FIG. 2 is the engine unit 17 which is a representation of the currently being developed Williams TSX-2 turboshaft of about 500 hp (375 kW) output. The TSX-2 should be very compact since it is essentially the core turbine of the FJX-2 which is a revolutionary microsize fan jet engine with diameter of only 14 inches (36 cm) and length of 41 inches (104 cm) which promises specific performance comparable to those of the large complex multi-stage axial compressor turbofans of the present. The antiquated Allison 250 family of light turboshaft engines, as typically used in light helicopters would be too bulky and would not be suitable. With future availability of the 500 hp Williams TSX-2 turboshaft engine, performance and affordability of the tilt-rotor plane will be very good as the new-design TSX-2 promises significantly lower costs, much better fuel economy and much lighter than the older design Allison 250 series. The engine 17 may be designed to operate in reverse flow, by which description, the engine receives air at its rear end through air intake duct 43, where it is filtered, then the air travels to the rear of the engine where the air is compressed and combined with fuel for combustion and exits the front end of the engine via a pair of exhaust pipes 44 angled rearward and slightly downward. Mounted on top of the engine 17 is transmission unit 16 which is of multi-stage planetary gear set design as commonly used in light helicopters. Given the small size and light-weight of this tilt-rotor plane design, the transmission needs to handle only 300–350 hp maximum, hence allowing the 500 hp engine to be significantly flat-rated. This enhances engine reliability and longevity and allows for very good high-altitude performance, which translates to high cruise speed with low fuel consumption. Torque output of transmission 16 is used to turn the rotor shaft 42 at a typical 450 rpm at take off hence necessitating very high torque in comparison to a conventional airplane propeller shaft. Since power pod 6 is attached to the fuselage on pivoting axis 14, it follows that the entire power pod 6 below the level of transmission 16 must withstand such a high level of torque, and since the engine 17 is mounted in tandem below the transmission 16, the engine 17 could carry some of the torque loads from the transmission thus requiring only a light weight metal cage 45 around the engine to convey the rest of the torque loads from the transmission 16 to the root end 6r of the power pod. Thus the engine and transmission as an integral unit can serve as main structural component of power pod when bolted to the root end 6r of the power pod, saving weight and cost. Only light-weight and easily removable covers are needed around the engine-and-transmission portion of the power pod. A fire detection sensor coupled with an effective fire extinguishing system coupled to a fuel shut-off mechanism is essential in the engine compartment, since a fire in the engine compartment can melt the rotor supporting structures leading to catastrophic separation of the main rotor from the fuselage. Another hazard would be an uncontained engine failure (engine explosion) leading to catastrophic main rotor separation, however, since the engine is of very small size and it operates maximally at only little above half of its rated power, this is a very unlikely event. Furthermore, by obtaining significant forward airspeed before climbing when terrain permits, the aircraft cannot fall very hard and the wing can provide for gliding in the case of catastrophic rotor-fuselage separation with sufficient airspeed, thus reducing this hazard. Likewise, during cruising flight, the wing can provide for similar gliding ability even though the aircraft nose would be much lighter with the rotor and the engine-transmission unit be gone. This can happen due to the very high tail-volume coefficient designed into this aircraft for counteracting the destabilization effect of the huge propeller well forward of the CG. High tail volume coefficient is easily attained in this aircraft thanks to the small, high aspect-ratio wing and the long fuselage. With the nose thus lightened, the aircraft may exhibit divergent stability (not stable) requiring constant pilot attention at the stick, but this should be within capability of any pilot when properly trained for this type of scenario through high-fidelity flight simulator. Referring to FIG. 10b, the catastrophic nature of a turbine engine's uncontained failure can be alleviated by mounting the turboshaft engine not co-axially with the rotor shaft, but at significantly offset distance from the rotor shaft's rotational axis, thus the engine carries no loads from the rotor's forces to the fuselage, and transmitting the engine power to the transmission via bevel gear reduction for the first stage of gear reduction. Thus, the best arrangement is to piggyback the engine on top of the power pod in the horizontal orientation, (or behind the power pod in the vertical orientation) accepting some aerodynamic drag and weight penalty. In this position, and if the power pod is made sturdy enough to withstand the engine's uncontained failure or engine fire, then no rotor-fuselage separation need to occur, as fire tends to project its heat to the upward and rearward direction.

Rotor Head Details

FIG. 3a reveals enlarged details of the rotor head 7H, rotor blade pitch control mechanism, and an alternative engine. For efficient forward cruising flight, a spinner 46 is used to cover up the rotor head mechanism, thus necessitating a compact rotor head design. Furthermore, the fragile and slender power pod design would favor a rotor head design with minimum shakes and vibration. For all above purposes, the patented tri-hinged rotor head design by Frank Robinson of Robinson Helicopter Co. would be ideal. Details on the tri-hinged rotor head may be found in U.S. Pat. No. 4,131,391. Briefly, the tri-hinged rotor head design is a modification of the two-bladed underslung rotor structure with see-saw teetering rotor head which has, besides the usual teeter hinge 47 having a hinge axis passing perpendicularly through the axis of the rotor shaft on top of the rotor shaft 42, two more coning hinges 48 on each sides of the teeter hinge 47 for attaching the rotor blades 7B. The pair of coning hinges (or individual blade-pivoting hinges)48 tallows the blades 7B to pivot up and down freely hence eliminates bending loads on the blade root and in turn reducing forces on the pitch control arms hence greatly reducing shaking motion on the control stick. On each side and branching out from the blade root collar 50 is pitch control arm 52, which is attached to pitch control rod 49 via ball joint 51. Ball joint 51 must line up with the axis of coning hinge 48 in order to prevent inadvertent change in blade pitch as the blade pivots on coning hinge 48. Pitch control rod 49 of the rotor blade links the pitch control arm 52 to intermediary arm 53. Intermediary arm 53 receives input from both the cyclical pitch rod 54 at its mid portion and from the collective-pitch control rod 55 at its root portion. Intermediary arm 53 conveys both cyclical and collective pitch input to the rotor blade's pitch control rod 49 located at the outer portion of arm 53. Collective-pitch control rod 55 is actuated by collective-pitch servo 56 located at the top of the rotor head 7H. Servo 56 is electrically operated. Cyclical pitch control rod 54 is attached on its lower end to a rotatable plate 57, which rotates on top of a tiltable stationary plate 58 forming a typical helicopters swash plate unit. Stationary plate 58 is tiltable via swash-plate arm 59, which is linked to push-pull cable 60. Push-pull cable travels inside a low-friction sheath to the cockpit to be linked to the joystick. The main rotor shaft 42 receives torque from transmission unit 16 as previously discussed. Transmission 16 has two stages of planetary gear set, a first stage 16A and a second stage 16B. For powering the tail rotor 15, a hydraulic pump 61 receives power from output of the first stage planetary gear set, driven by chain drive 62. Pressure generated from hydraulic pump 61 will be conveyed via hydraulic line (not shown) to the tail rotors hydraulic motor 24. By obtaining power from the transmission and not the engine, in the event of engine failure necessitating autorotation, there is still power available to the tail rotor for yaw control as in any helicopters.

Alternative Rotary Engine

Below the transmission unit 16 is an alternative type of engine from the TSX-2 turboshaft powerplant, as mentioned, since the TSX-2 is not yet fully developed nor proven. This alternative engine 17a is a Wankel type of rotary engine, which, although has lower power-to-weight ratio than the turbine engine, it is well proven through decades of high-endurance automobile racing, it is available now and has low acquisition and operational costs. Rotary engine 17a is a 3-rotor design as in the Mazda-20B engine, and is capable of producing over 350 hp (262 kW) while weighing under 300 lbs (136 kg). With one intake pipe 63 and one exhaust pipe 64 going into and out of each rotor, the engine is considerably more bulky than the TSX-2 turbine engine, but is still less bulky than the Allison 250 series of turboshaft engines. Engine air intake is obtained from air-scoop 43a and the air will go through an air filter 66 to get to a turbo-charger 17T where the air is compressed and fed to an intake manifold 65 and then through individual intake pipes 63 into the engine. Exhaust gas from each rotor is conducted through individual exhaust pipes 64 to exhaust manifold 64M and then to the turbo-supercharger 17T where energy is released and then exit through exhaust pipe 44. A large size oil sump 68 is located such that the oil level is below the engine in both the horizontal and vertical orientation. Oil pick-up device 67 with a weighty clunk 67C and flexible tubing 67T is necessary for satisfactory operation in both modes. Accessory devices 69 such as alternator, oil pump and water pump may be located below the engine (in the vertical orientation) and is gear-driven from the engine output shaft 70. The engine wall is water cooled and the engine rotor is oil cooled, and the radiator (not shown) and the oil cooler (not shown) are best located in the front section of the fuselage 2F, thereby incurring no additional aerodynamic drags even though they must be of significant size in order to cool this high-output compact engine at zero airspeed, necessitating electric fans drawing air through the radiator. Coolant hose of significant length (not shown) will be necessary to circulate cooling fluids to and from the radiator, similar to WWII liquid-cooled fighter aircraft, with front-mounted engine and rear-mounted radiator.

Rationale for Variable Rotor Blade Twist

FIGS. 4A–4L illustrate this tilt-rotor plane's unique variable blade twist angle of the rotor blade from root to tip. Variable twist means that the pitch angle of the blade (with respect to the plane of rotation of the rotor blades forming a rotor disc) between the root and the tip is variable within the cockpit depending on the flight mode. For example, for fast cruising flight wherein the ratio of the blade's tip speed to the airspeed of the aircraft is low due to Mach-number limitation on the tip speed, the twist angle between the tip and the root must be high, at least 40 degrees for adequate efficiency. This can be visualized referring to FIGS. 4b–4e, which are graphical representations of the airspeed velocity vectors that the blade encounter at distance of 12.5%, 25%, 50% and 100% of the blade's radius from the rotor head 7H respectively. In FIGS. 4b–4e, vectors 81B–81E represent forward airspeed velocity of the aircraft, vector 82B–82E represent rotational airspeeds velocity of the blade at respective locations, and vectors 83B–83E represent the resultant airspeeds velocity that the blade profiles 84B–84E encounter at that respective locations. The ratio of tip speed to forward speed is 1.75, so at the most efficient cruise speed of 155 mph (248 kph) at 8000 ft, the tip speed will be 270 mph (432 kph), which is much slower than a typical helicopter's rotor tip speed of 450 mph (720 kph). This will greatly reduce noise, vibration, stress, and wear on the entire rotor and transmission system, thus operating cost is significantly reduced. It can be seen that a high degree of tip-to-root twist in the rotor blade is necessary in order for the blade to have the optimal angle of attack for optimal efficiency. Without a sufficient amount of twist, the root portion of the blade will have less and less angle of attack with respect to the resultant airflow and will eventually develop negative angle of attack leading to negative thrust, and worse, the innermost portion of the blade will stall at negative angles of attack creating a very very high amount of drags disproportional to its surface area.

On the other hand, in the autorotation mode, referring to FIGS. 4f–4i, the tip-to-root twist must be reversed due to the reverse flow of air through the rotor blades, or at least minimum to no twist as shown, in order to prevent excessively high positive angle of attack at the root portion of the blade leading to blade stall at the root hence very high drag, leading to inefficient autorotation. A typical helicopter's main rotor blade has around 8 degrees of positive tip-to-root twist for optimal efficiency at cruise speed and at hovering, so reduced efficiency at autorotation is a compromise. In FIGS. 4f–4i, vectors 81F–81i represent velocity of airflow up from under the rotor blades, vector 82F–82i represent rotational airspeeds velocity of the blade at respective spanwise locations, and vectors 83F–83i represent the resultant airspeeds velocity that the blade profiles 84F–84i encounter at that respective spanwise locations. It can be seen that as one moves from the tip to the root of the rotor blade, as from FIG. 4i to FIG. 4f, the angle of attack encountered by the blade profile at respective spanwise location is increased gradually, such that even for a zero degree of twist as illustrated, the innermost portion of the blade experiences an angle of attack of 20 degrees, which is well above the airfoil's stall angle. The area that is stalled, however is relatively small and is moving very slowly, therefore it is of little significance, and this trade off is necessary because the range of variable twist is limited to the flexibility of the blade as will subsequently discussed. The main emphasis of FIGS. 4b to 4i is that without variable twist capability in the rotor blade, neither efficient forward flight nor efficient autorotation would be possible. The twin tilt rotor Bell-Boeing V-22 has no variable twist capability in its rotor blades, and it achieves efficient forward flight due to a highly twisted rotor blades, but it bypasses the requirement for autorotation by having two-engine fail-safe design, one in each wing tips connected by a long shaft. The highly twisted rotor blades of the V-22 waste a lot of power in the VTOL mode, and the V-22 requires more power-to-weight ratio than a comparable helicopter of the same rotor blade surface area loading. By lessen the degree of blade twist in the VTOL mode from the high degree of blade twist for cruising flight, the otherwise same rotor can lift 20% more weight during lift off. This may not seem to be much, but a 20% increase in gross weight without a significant increase in empty weight means that payload may be increased as much as 50%, thus a very strong motive for the effort in achieving variable rotor blade twist in a tilt-rotor airplane. This further means that instead of using two expensive high performance turbine engines for redundancy against engine failure, a single low-cost piston engine may be used, thus greatly decrease the cost associated with tilt-rotor airplane, in addition to the use of a simple two-bladed prop-rotor system.

FIGS. 4j to 4L summarize the above by illustrating the shape of the rotor blade in different mode of operation. In FIG. 4j, the rotor blade is shown is in high efficiency cruising flight, with minimum rotor's rotational speed, high blade pitch, and maximum tip-to-root twist of about 40 degrees or even higher. In FIG. 4k, the rotor blade has a low to medium amount of twist of about 20 degrees or less, for use in the vertical take off, landing, or hovering mode. This moderate amount of twist tends to increase the lift coefficient of the blade toward the root portion, hence decreasing the lost in efficiency by reducing the strength of vortex flow at the tip of the blades. Furthermore, since the tip portion of the blade travels at higher speed than the root portion, at the same angle of attack, it displaces air downward at a higher speed than the slower root portion of the blade. If the different in speed of the air layers is high, turbulent can develop between the layers in the form of eddies that can rob efficiency. In FIG. 4L, the rotor blade has little to no twist for use in autorotation as discussed. If the range of variable twist achievable is less than 40 degrees, then some positive twist may be allowable for the autorotation mode without severely affecting autorotation efficiency, given the presence of the pair of wings 3 that can sustain half of the aircraft's weight at the airspeed of maximum autorotation efficiency, thus decreasing the rotor's weight-to-surface-area loading in half, thereby resulting in reduction in sink rate in comparison to a conventional helicopter.

Blade Variable Twist Mechanism

To provide for variable twist, the blade is made of flexible material, and along with relatively high aspect ratio, allowing for twist of 20 degrees in each direction without damage. Referring to FIG. 4a, the entire blade 7B is pivotable around a torque rod 85, which traverses along a spanwise pitching axis for the rotor blade. Torque rod 85 emanates from the rotor head 7H and is made of very strong material. Functionally, rod 85 is similar to a metal blade spar of a typical helicopter rotor blade. The tip end 7E of blade 7B is kept from pivoting with respect to torque rod 85 by metal gusset 86, which is tightly affixed to both torque rod 85 and the tip end 7E of blade 7B. Hence, in order to provide for variable twisting along blade 7B, it is a simple matter of providing for pivoting motion of the root portion 7R of blade 7B with respect to the tip portion of the rotor blade.

Figures 5A, 5B, 5C:
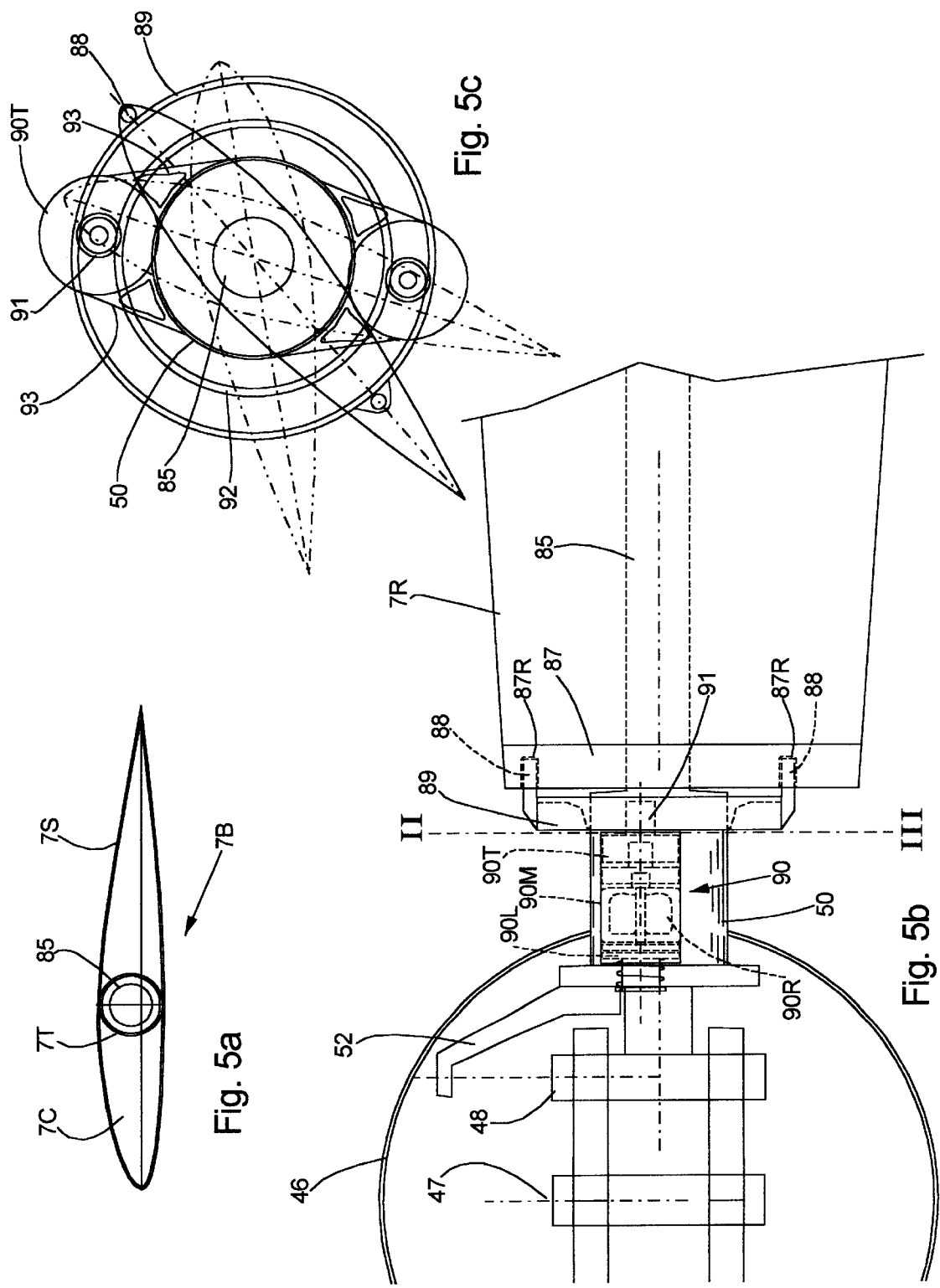
FIGS. 5a to 5c reveal details of variable twist mechanism and actuation.

Referring to FIG. 5a, which is a cross section of the blade 7B, there is shown the torque rod 85 traversing in an outer tube 7T forming a torque rod channel, spanning the thickness of the blade 7B. Blade 7B is formed by using a pre-formed core material 7C, covered with several layers of high-tensile strength but somewhat elastic cloth material hardened by epoxy resin forming skin layer 7S. Before the wet epoxy lay-up of the skin material 7S over the core material 7C, an outer tube 7T made from hardened composite material is inserted between the core material 7C forming a channel for inserting the torque tube 85 later on. A 20-degree of positive tip-to-root twist is provided for during the molding process and the blade therefore will be so-twisted at rest. The chosen blade airfoil is a semi-symmetrical section with very low pitching moment coefficient. For zero pitching-moment coefficient, a symmetrical section may also be used, but with slightly reduced efficiency.

Blade Twist Servo Mechanism

Referring to FIG. 5*b*, which is a close-up view of the root portion 7R of the blade 7B, showing servo mechanism for actuating the variable twisting of the rotor blade. The torque rod 85 is shown emanated from and is firmly attached to blade root collar 50. Collar 50 is pivotable by pitch control arm 52 for changing the blade's pitch. Root portion 7R is attached to metal bracket 87 for transferring the rotational motion from servo unit 90 to pinion gear 91 to final reduction bevel gear disc 89 via pegs 88 protruding from disc 89. Pegs 88 are to fit snugly onto recess 87R formed into bracket 87. Gear disc 89 is freely rotatable around blade root collar 50 with self-lubricating bushing (not shown). Servo unit 90 is comprised of an electric motor 90M and a reduction planetary-gear transmission 90T to generate high torque to pinion gear 91. As with the power winch motors 71 discussed in connection to FIG. 3*b*, the core 90R of motor 90M is provided with an automatic spring-loaded locking mechanism 90L that is releasable via solonoid means upon electrical activation of the motor 90M.

FIG. 5*c* is a cross-section of FIG. 5*b* along line II-III showing a pair of servo units 90 with pinion gears 91 disposed on opposite sides of gear disc 89. To reduce excessive force on pinion gear's teeth, an inner gear disc 92 is provided to divide the sheer force on gear teeth in half, thereby preventing catastrophic failure. Inner disc 92 is necessarily concentric with outer disc 89, and both discs rotate around root collar 50 in opposite directions. Fairings 93 are fitted between the servo units 90 and root collar 50 for firm attachment of both, and for reducing aerodynamic drag in cruising flight. Notice that both servo units are aligned almost parallel to the direction of forward flight for maximum drag reduction.

Use of Fuel Storage as Anti-Torque Means in Cruising Mode

Figure 6:
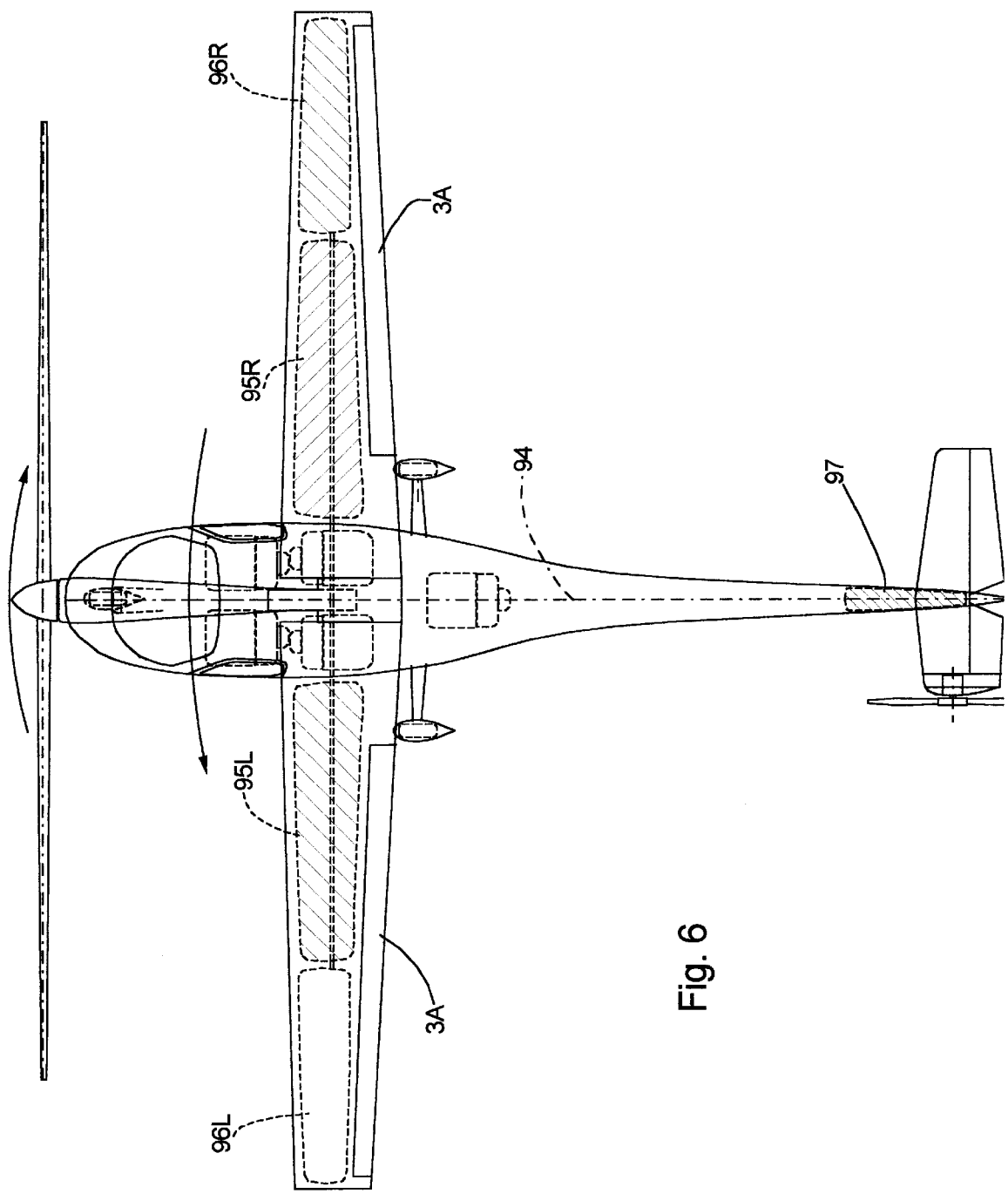
FIG. 6 show locations of various fuel tanks in order to allow for proper weight balancing throughout various modes of flight.

Referring to FIG. 6, there is shown the aircraft's fuel storage locations in order to best compensate for the enormous torque of main rotor 7, and the shift in center of gravity of the aircraft resulting from power pod 6's fore and aft travels. For example, at 250 hp (187 kW) transmission output and at 500 rpm rotor speed, the torque required is 2644 ft-lb (38.6 m-kN), which 4–5 times that of a fixed wing aircraft. However, at 13 ft (3.96 m) distance from the main rotors rotational axis 94, the force required to overcome this torque is only 202 lbs (898 N). Thus, by having 3 or 4 fuel tanks located within the wing 3, with two inboard fuel tanks 95L and 95R, and at least one right outboard fuel tank 96R capable of holding at least 100 lbs (45 kg) of fuel, then the main rotor's torque can be balanced partially by the fuel's weight thus requiring less ailerons' trim hence less aerodynamic drags, and at half power with half of the rotor's torque, the entire torque of the main rotor can be balanced by fuel weight alone. Effectiveness of aileron trimming varies with airspeed, therefore, if one relies on aileron trim alone to overcome the main rotor's torque, then it is necessary to constantly retrim the aileron when the airspeed changes, sometime drastically if exposed to wind gust in flight. Furthermore, should the wings enter a stall while climbing at high power when the ailerons are not even, there is a tendency for one wing to stall before the other, thus precipitating a spin. By using fuel weight for partially or fully overcoming rotor's torque, there will be less adverse roll at a wide range of airspeed when the rotor's torque is kept constant. When the rotor's torque is changed, it is necessary to pump fuel into or out of the outboard fuel tanks 96R or 96L a corresponding amount in order to maintain balance in the roll axis. Thus, for vertical take off or landing, both outboard wing fuel tanks 96 will contain the same amount of fuel, at about half of their capacity. Upon transitioning to cruising flight, fuel will be pumped out of the left outboard tank 96L onto the right outboard tank 96R thereby maintaining balance against torque from the main rotor. If a large fuel capacity is not needed, then only the right outboard tank 96R is needed besides the two inboard tanks 95; therefore in the vertical take off or landing phase, the right outboard tank 96R will be left empty. The fuel in the right outboard tank 96R will be last consumed, and when this fuel is being consumed, preparation for a descent from cruising altitude should be made by reducing torque from the main rotor thus maintaining the existing balance in roll axis without requiring aileron trim. Similarly, an auxilliary fuel tank 97 in the tail end of the fuselage would be beneficial in maintaining optimum pitch balance during various phases of flight. Due to a rather long tail-arm moment, only a relatively small capacity is needed to balance against a large change in loads in the cabin section.

Alternative Embodiment with Retractable Landing Gears and Shock Absorbtion

FIG. 7*a* and FIG. 7*b* represent another embodiment of this invention, a retractable-landing gear version for better cruise performance in term of speed and range. Far more important, however, is that this embodiment employs widely-spaced landing gears in the form of freely castering rolling wheels to eliminate roll-over accidents that are very prevalent in current helicopter designs due to their narrow skid width and short skid length. Roll-over accidents are almost never fatal but are very expensive and very inconvenient for the helicopter owners. Furthermore, the landing gears in this retractable version has a very large range of vertical displacement with very good non-bouncing shock absorption capacity due to their oleo-pneumatic (air-hydraulic) design, thus allowing very hard landing, a non-level landing, or a landing with slow ground speed without any damage. A typical skid-equipped helicopter upon a hard landing will bounce back up due to the springy skid leg, then drop down hard again to roll over resulting in total damage. The same consequence can happen if the helicopter is landed with even a slow drift, or without being perfectly level. Fearing the above consequence of a harsh landing during autorotation practice, inexperience helicopter pilots frequently "pull" collective pitch too early, thus also resulting in a hard landing, but with high incidence of very damaging tail boom strike by the rotor since its rotational speed is far too low to arrest the powerful downward inertia as the result of a hard landing. By maintaining sufficient rotor speed during the touch down in an autorotation, damage to rotor head, blades and tail boom can be avoided. Furthermore, without having to concentrate on achieving a perfectly soft, level, or stationary touch down, a novice pilot can set a steady sink rate and then concentrate more on looking out for and avoiding near-ground obstacles such as power lines, trees etc. during the landing phase that frequently cause fatal collision accidents to helicopters.

To accomplish the above, this retractable landing gear version is of low wing design, and it has two main wheel axles 99 disposed on the aircraft's centerline 94 on the bottom of the fuselage, and two small outrigger struts 101 each supporting an outrigger wheel 102 on each sides. Each main-wheel axle 99 is supported by a long and sturdy oleo-pneumatic strut 98 in the middle, and each wheel axle carries a pair of thin wheels 100 disposed on both sides, allowing strut 98 to have maximum range of travel. With maximum contraction of strut 98, the main wheels 100 are partially retracted within the fuselage for reduction of aerodynamic drags. Axle 99 is attached to the rear aspect of strut 98 thereby allowing for castering action by strut 98. The outrigger strut 101 each only has one outrigger wheel 102 mounted in significant positive camber with respect to strut 101 thereby aligning the ground contact point 103 with the long axis 104 of strut 101, referring to FIG. 7b. The outrigger wheel 102 should be made of material of low coefficient of friction such as nylon to avoid shimmy and excessive stress on strut 101. Referring to FIG. 7a, the outrigger strut 101 is mounted at the vicinity of the wing's leading edge 3L and is canted forward thereby creating castering effect on the outrigger wheel in addition to the outrigger wheel being attached to the rear aspect of strut 101. The outrigger wheel 102 may be retracted by swinging action rearward and upward whereby the outrigger wheel 102 will be near the trailing edge 3T of the wing 3, similar to those of the VTOL Harrier Jump Jet. The castering nature of the landing gears preclude the use of steering nor of braking, because the brake line will likely get wound up around strut 98. All motions, including forward, backward, and sideway will be provide by offset thrust from the main prop-rotor 7, and steering will be done by tail rotor 15. The main prop-rotor 7 cannot be tilted sideway, but the aircraft may be leaned to one side via hydraulic means on outrigger struts 101. For wheel braking especially when parked, the main wheels 100 may be retracted maximally into the fuselage where the wheels can be pressed into the wheel well (not shown) and stopped.

Cockpit Control Layout

Figures 8A, 8B:
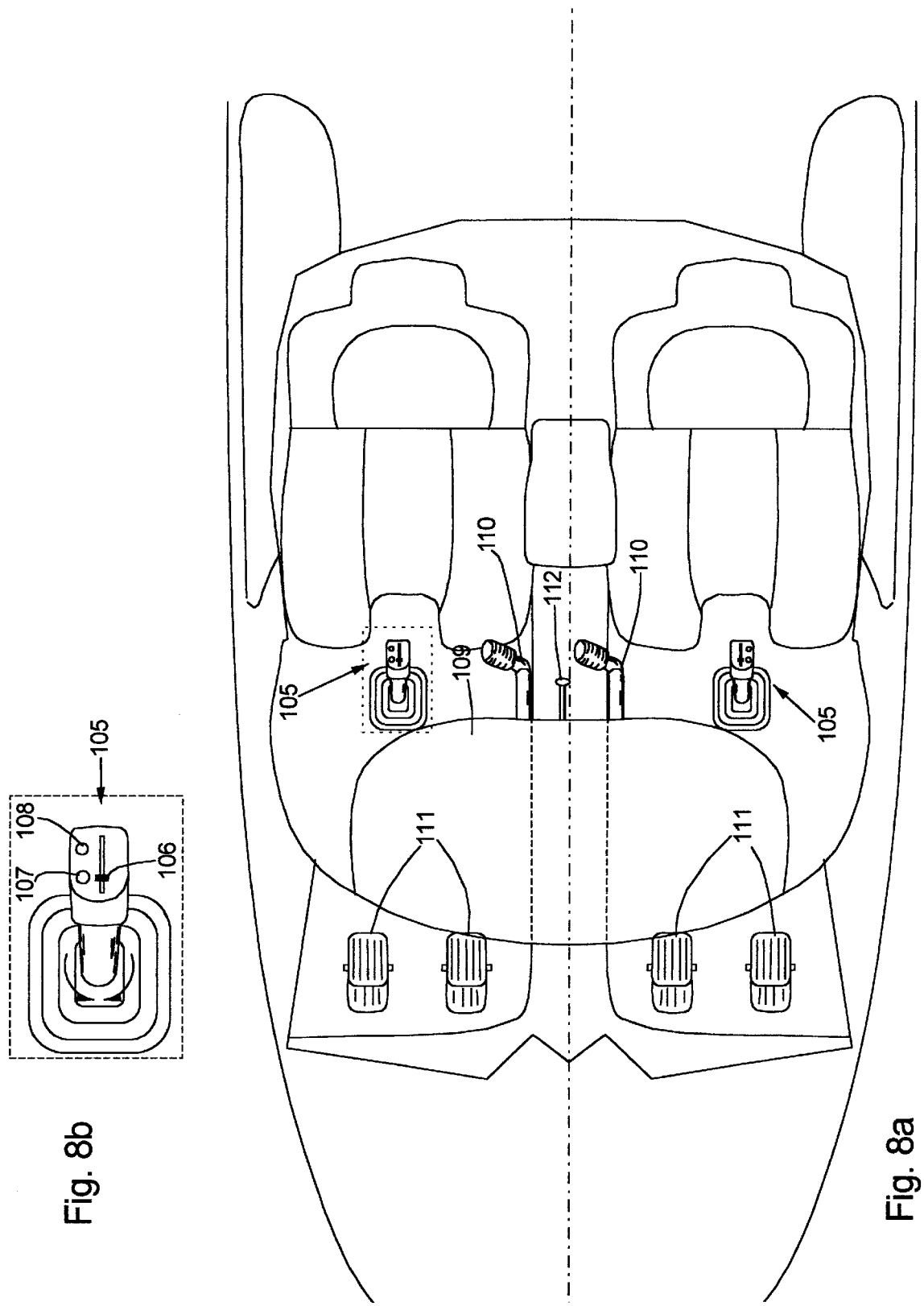
FIGS. 8a and 8b reveal cockpit layout accompanying both helicopter controls and airplane controls.

FIG. 8a and 8b show a possible cockpit arrangement incorporating separate control handles for the fixed wing and tails and for the main rotor cyclical pitch and tail rotor. The pilot's center joystick 105 is used for cyclical pitch control both pitch and roll of the main rotor. A slider 106 on top of joystick 105, referring to FIG. 8b which is a closed-up view of joystick 105, is used to control the collective pitch of the main rotor. Slider 106 is essentially a potentiometer for controlling the pitch control servo as detailed earlier. The throttle control is also done via electrical servo and the throttle control is mixed with collective pitch control in the VTOL mode, so that the throttle is advanced with increase in collective pitch and vice-versa. For tilting of the main rotor, there are provided two buttons, 107 and 108, on top of Joystick 105. Pushing on button 107 will tilt the main rotor forward, and pushing on button 108 will tilt the main rotor upward and rearward. An arming switch (not shown) used for activating buttons 107 and 108 may be necessary to prevent inadvertent tilting of the main rotor during cruising flight. The pilot's side joystick 110 is used for controlling the aileron and elevator of the aircraft as in conventional practice. The presence of both joysticks 105 and 110 allows for redundancy of control in the event of a failure of any control linkage in cruising flight, in which case, the main rotor cyclical pitch should have ample of authority to guide the aircraft to a safe landing in the event of failure of either the elevator or rudder control, and vice-versa. Furthermore, due to the presence of the wing 3, the aircraft is more susceptible to strong wind during hovering than a conventional helicopter. Therefore, all hovering should be done facing the wind head-on, and that any adverse rolling motion of the aircraft should be immediately countered by both aileron control, cyclical pitch control and rudder in combination with tail rotor control in order to avoid undesirable oscillation and lost of control at low speed. The yaw control pedals 111 are used to control both the rudder and the tail rotor, and control linkage can be by any suitable method, including direct mechanical, electrical or hydraulic. As discussed, the rudder may be controlled by electrical servo for automatically trimming the rudder a predetermined amount during forward flight when the main prop-rotor is tilted upward in order to assist the tail rotor in providing anti-torque function. If a mechanical linkage from the pedals 111 to the rudder is chosen, then, the tail rotor may be controlled by twisting movement in joystick 105, referring to FIG. 8b, thus allowing for more redundancy in control system. For controlling the throttle during cruising flight, a throttle control knob 112 is provided in the middle of the instrument panel 109. In cruising flight, the throttle control must be disengaged from the collective pitch control for maximum efficiency, because at low propeller rotation rates, high propeller pitch may be required at low throttle setting. Disengagement of throttle and collective pitch control can be done electrically, and once this is done, the collective pitch slider 106 is used solely for propeller pitch control as in fixed-wing aircraft. Setting an appropriate degree of propeller pitch is simply a function of the ratio of forward airspeed of the aircraft to the rotational speed of the propeller tip, and an onboard computer can guide the pilot in this setting. Throttle control is of course variable depending on climbing, cruising or descending condition. Even though the control system of this tilt-rotor plane is more complex than that of either the helicopter or the fixed wing aircraft, the availability of low-cost micro-computer can greatly assist the pilot, and can allow for single-pilot certification. Providing for complete computer control of the aircraft may not be wise at the present, due to the rather unreliability of current microcomputer and software system, but may be possible in the future.

Alternative Main Rotor Blade Design

FIG. 9a and 9b show an alternative main-rotor-blade design incorporating variable twist feature but is more resistant against blade flutter and more aerodynamically efficient. This alternative design has a tip section 7T having a scimitar shape which swept backward and with supercritical airfoil section for reducing shockwave at the transonic speed region thus allowing higher rotor tip speed without increase in noise nor loss in efficiency. Increase in rotor speed in the VTOL mode reduces the lift cofficient required of the rotor blade hence resulting in higher efficiency especially if a symmetrical laminar-flow airfoil is chosen, since this type of airfoil has a sharp drop in drag coefficient at lift co-efficient below 0.4 and a sharp rise in profile drag at lift coefficient above 1.0. In cruising flight, the lift coefficient of the rotor blade will be well below 0.4 hence allowing for low drag in spite of the prop-rotor's enormous size. The scimitar-shaped tip with smaller tip chord reduces the pitching moment of the blade tip and it also reduces vortices at the tip hence increase efficiency and reduces the potential for tip flutter. The torque rod 85 is made shorter thus is more rigid and the root section 7R is made thicker for even more rigidity. The tip portion 7T has a fixed degree of twist optimized for cruise condition.

Alternative Engine Mounting Layout

FIG. 10a discloses a twin turbine engine version of this single tilt-rotor plane. If a new generation of turbine engines can be made as to be as inexpensive as the NASA GAP program has promised, then this twin engine configuration would show much improvement over the single engine version with respect to safety. The increase in acquisition cost of a second engine would be partially offset by the absence of the rotor blade's variable twist mechanism, thus allowing rotor blades 7B to be made simpler thus less expensive. Because only one engine is required during cruising flight, there should be no increase in operating cost as the result of having a second engine. As shown, the turbine engines 17 are mounted in reverse with the exhaust pipes 44 toward the front and the engine output shaft 114 pointed rearward where it transfer power from bevel gear 116 on shaft 114 to gear 115 of the transmission input shaft 117 going upward into transmission 16. The transmission output shaft 42, also referred to as the main rotor shaft 42 exits upward from transmission 16 to the rotor hub 7H. Gears 116 and 115 create a speed reduction of about 3:1, thus allowing the turbine output shaft RPM of about 18,000 to be reduced to about 6,000 which is on the same level as that of the rotary engine 17A as discussed in connection with FIG. 3a. Overrunning clutches (not shown) should be provided to allowed one engine to continue running while the other engine is being shut down, as in conventional twin-engine-single-rotor helicopters.

FIG. 10b represent a single engine version of the above set up, with only a single engine 17 mounted offset from the rotor shaft 42. FIG. 10b is in contrast to FIG. 2, in which with the engine 17 is mounted coaxially with rotor shaft 42. The advantages of offset-engine mounting position would be: 1) lower development and manufacturing cost due to component-sharing with the twin engine version, 2) reducing risk of rotor separation and destruction of control cables or hydraulic tubing due to fire or uncontained engine failure, and 3) easier engine access that facilitates frequent inspection and maintenance. The only disadvantage is a slight increase in weight and aerodynamic drag.

SUMMARY, RAMIFICATION, AND SCOPE

Accordingly, the reader will see that the single-tilt-rotor VTOL airplane of this invention is not just an aircraft with speed and range comparable to a typical high performance aircraft, but it has far greater utility than the conventional fixed-wing aircraft, and it is much safer and much more economical to operate than a comparable helicopter. By bringing the acquisition cost and operating cost of a VTOL airplane down to be competitive to that of a conventional fixed-wing airplane while maintaining high speed, range, and safety, it can be expected that the role of general aviation will be much more expanded to the vast number of frequent fliers who must now suffer the inconveniences of commercial air travel, with hub-and-spoke system causing significant delays, plus severe traffic congestion on the ground making the ground trip to the airport equally hectic. A VTOL airplane can operate from a number of vertiports scattered around numerous sub-urban locations of a metroplex thus making air travel much more rapid and convenient. The high speed and high maneuverability of the single-tilt-rotor VTOL airplane along with its low cost of operation also make it ideal for military applications replacing the slower and more vulnerable army attack and army transport helicopters. Its high speed and long range including long loitering time make it ideal for coast guard, border patrol or drug interdiction duties, as well as search and rescue, and virtually any roles filled by the helicopters.

While I have show&n and described in considerable details what I believe to be the preferred form of my invention, it will be understood by those skilled in the art that the invention is not limited to such details but may take various other forms within the scope of the claims that follow. For example, for a very small size tilt-rotor airplane with only 2 seats in front, or in a small unmanned drone aircraft with a very short nose section, the use of the connecting bar 12 and the associated power winches for translational fore-aft movement of the power pod would not be necessary, since the power pod 6 needs not travel far back. Instead, a single pivotable mounting point joining the mid portion of the power pod to an attachment rod on top of the fuselage right behind the front seats is all that is necessary, allowing the power pod to pivot upward or forward, with the lower/rear end of the power pod acting as a weight-balancing shaft by means of a spring connected to the rear end of the power pod, thus reducing complexity and production cost. Only one servo-motor would be necessary to tilt the main prop-rotor in this configuration.

What is claimed is:

1. In a VTOL airplane capable of a vertical takeoff and landing mode (VTOL) as well as an efficient horizontal cruising mode, the combination comprising:

a pair of wings disposed on opposing lateral sides of the airplane for supporting the airplane in the horizontal mode, each of said wings having a wing tip and a wing root, a horizontal stabilizing surface and a vertical fin disposed at a tail end of the airplane for providing necessary aerodynamic stability in horizontal cruising mode, a fuselage having a top, a bottom, a front section, a tail section, and a longitudinal axis forming a center line running from the front section toward the tail section, means for controlling said airplane in the VTOL mode in all 3 typical pitch, roll and yaw axes, means for controlling said airplane in the horizontal cruising mode typical for a conventional airplane, comprising of ailerons, rudders and elevator, a main prop-rotor mounted on top of a power pod having a significant length, said power pod is disposed generally in a vertical plane containing the longitudinal axis of the fuselage, said prop-rotor having a plurality of elongated rotor blades radially arranged around a main rotor axis, said main rotor axis traverses the length of the power pod, said main rotor axis is tiltable generally in the vertical plane of the longitudinal axis of said fuselage, between a vertical orientation wherein said main prop-rotor rises above the fuselage for providing vertical lift in the VTOL mode, and a horizontal orientation wherein said main prop-rotor blades protrude in front of the fuselage's front section, for providing forward thrust in the horizontal cruising mode, rotor tilting means for tilting of said main prop-rotor over 90 degrees between the vertical orientation and the horizontal orientation, engine powering means housed within said power pod, said power pod having a top end mechanically connected to said main prop-rotor for powering said main prop-rotor in both VTOL mode and horizontal cruising mode, said power pod having a location significantly below said top end thereof pivotably connected to a structural member of the fuselage, said powering means generates a reactive torque in the yaw axis on the fuselage as a resulting of turning said main pro-rotor in the vertical orientation, and said power means generates a reactive torque in the roll axis on the fuselage when turning said main prop-rotor in the horizontal orientation, yaw-control means for countering said yaw-axis reactive torque effect from said power means, and, roll-control means disposed in the wings capable of rotating said wings in the roll axis, for countering said roll-axis reactive torque in the horizontal cruising mode.

2. The VTOL airplane of claim 1 wherein said rotor-tilting means is comprised of:

pivoting means for pivoting the rotational axis of said main prop-rotor on a pivoting axis on a transverse relationship with respect to the fuselage, thereby varying a direction of thrust from the main prop-rotor with respect to the fuselage, translating means for moving said main prop-rotor with respect to the fuselage with a fore-and-aft vector component along the longitudinal axis of the fuselage, thereby allowing the main prop-rotor to be moved significantly forward to be in front of the fuselage when said main prop-rotor assumes the horizontal orientation for proper clearance of the rotor blades from the fuselage, and allowing said main prop-rotor to be moved significantly rearward when said main prop-rotor assumes the vertical orientation for proper balancing of vertical lift during a vertical take off, and, coordinating means for coordinating said pivoting means and said translating means into one control function for convenience and for preventing the rotor blades from inadvertently striking the fuselage.

3. The VTOL airplane of claim 2 wherein the pivoting means and translating means for said main rotor are comprised of:

a connecting bar having a significant length, a proximal end and a distal end, said distal end of said connecting bar is fixedly attached to the lower end of the power pod, whereas said proximal end of said connecting bar is pivotably attached to an attachment rod inside the fuselage, thereby allowing the lower end of the power pod to travel rearward when the connecting bar is pivoted rearward around its fuselage attachment rod and allowing the lower end of the power pod to travel forward when the connecting bar is pivoted forward, and, means for pivoting the connecting bar at its fuselage attachment rod.

4. The VTOL airplane of claim 3 wherein the means for pivoting the connecting bar at its fuselage attachment rod is comprised of a first winch disposed in a rearward direction behind the poster pod near the bottom of the fuselage with its cable attached to the lower end of the power pod, and a second winch disposed in a forward direction near the top of the fuselage with its cable attached near the lower end of the power pod, thereby allowing the first winch to tilt the power pod and connecting bar assembly vertically and rearwardly, and allowing the second winch to tilt the power pod and connecting bar assembly horizontally and toward the front of the fuselage.

5. The VTOL airplane of claim 3 wherein the lower end of the power pod is pivotably attached to the distal end of the connecting bar, thereby allowing the power pod and the main rotor to be freely pivotable at one spot without translational fore-and-aft movement that would have resulted when the entire connecting bar and power pod assembly is pivoted at the fuselage attachment rod, and, Means for pivoting the power pod at its attachment to the connecting bar.

6. The VTOL airplane of claim 5 wherein the means for pivoting the power pod at its attachment to the connecting bar is comprised of:

A first winch disposed toward the front section of the fuselage with its cable attached to a front-facing side of the power pod, and a second winch disposed toward the tail end of the fuselage with its cable attached to a rear-facing side of the power pod, for stabilizing the power pod in the fore-and-aft direction with a significant degree of mechanical advantage.

7. The VTOL airplane of claim 6 Wherein the means for pivoting the power pod at its attachment to the connecting bar is further provided with oscillation damping means, comprising of spring-loaded shock struts filled with a type of fluid suitable for damping oscillatory motion, said shock struts are in serial mechanical connection between the winch and the fuselage, whereby the fluid in the shock strut is set up to absorb oscillatory movement of the power pod with respect to the fuselage.

8. The VTOL airplane of claim 1 wherein the yaw-control means in the VTOL-mode further comprising:

a tail rotor in a sideway orientation disposed at the tail section of the fuselage, said tail rotor generates sideway thrust for counteracting said yaw-axis reactive torque of the main prop-rotor, a rotor hub having variable pitch-control mechanism and a plurality of rotor blades, said rotor hub has rigid non-flapping design similar to an airplane propeller hub for reducing cost and complexity but resulting in thrust differential among the rotor blades with forward airspeed of the airplane, motor means for rotating said tail rotor, and pitch-control means for the tail rotor blades for controlling the sideway thrust of the tail rotor, said pitch-control means reduces the sideway thrust of the tail rotor gradually with increasing forward airspeed of the tilt-rotor airplane, thereby reducing thrust differential of the non-flapping tail rotor blades.

9. The VTOL airplane of claim 8 wherein the motor means for rotating said tail rotor is comprised of a hydraulic motor mechanically linked to said tail rotor hub, said hydraulic motor receives hydraulic pressure from a hydraulic line connected to a hydraulic pump, said hydraulic pump receives power from the engine power means of the airplane.

10. The VTOL airplane of claim 1 wherein the means for controlling the airplane in the VTOL mode is via typical helicopter main rotors cyclical pitch control, whereas when hovering in strong wind, the airplane will be further controlled by the ailerons, rudder and elevator as the airplane is maintained in alignment with direction of the wind, thereby reducing destabilizing effect of the wind acting upon the airplane's large aerodynamic surfaces.

11. The VTOL airplane of claim 1 wherein the main rotor's roll-axis reactive torque in the horizontal cruising mode potentially causes the wing tip on one side to go up and the other wing tip on opposite side to go down, the roll-control means of the airplane further comprising:

at least one fuel tank located near the wing tip region of the up-going wing tip, at least one other fuel tank located elsewhere in the airplane except near the up-going wing tip region, all of said fuel tanks are connected by fuel tubing permitting fuel transfer from one fuel tank to another, and, fuel pumping means for transferring fuel from one fuel tank to another in response to variation in torque input to the main rotor, thereby creating a weight differential between the wing tips on both sides that can at least partially compensate for the roll-axis reactive torque of the main prop-rotor, resulting in drag reduction due to less aileron trimming needed.

12. The VTOL airplane of claim 1 wherein the main prop-rotor blades have root-to-tip twist that is variable, the combination further comprising:

the main prop-rotor having a plurality of elongated rotor blades radially arranged around a rotational axis of the main prop-rotor, said rotor blades rotate in a plane forming a rotor disc, said rotor blades having a tip portion, a mid portion and a root portion, each of said portion is of airfoil shape having a chord line forming an angle with the plane of the rotor disc defining a pitch angle at a particular spanwise location, said rotor blade further having variation in the pitch angle in a gradient fashion from the tip portion toward the root portion whereas said variation in the pitch angle defines a degree of blade twist from root to tip, thereby positioning each portion of the rotor blade at an optimized angle of incidence with respect to a resultant airflow direction at any given spanwise location for improvement in rotor efficiency at a given mode of operation of the VTOL-capable airplane, means for varying the degree of blade twist of said rotor blade, thereby optimizing efficiency of the prop-rotor in both VTOL and horizontal cruising modes of the airplane, a rotor hub for holding the rotor blades, and, means for changing the pitch angles of all spanwise locations in the rotor blade at once, also referred to as collective pitch and cyclical pitch control as in helicopter practice, for controlling vertical climb rate, lateral acceleration, and forward speed of the VTOL-capable airplane, said pitch changing means generates a significant amount of pitch-controlling torque around a spanwise pitching axis of the blade.

13. The prop-rotor system of claim 12 wherein the means for varying the degree of blade twist of each of the rotor blade further comprises:

said rotor blade having a sufficient degree of flexibility allowing said rotor blade to be twistable a significant number of degrees from root to tip without damage, said rotor blade has a torque-rod channel formed within and traversing along the rotor blade's spanwise pitching axis, a torque rod linked to the rotor hub, said torque rod extends from the rotor hub to the blade tip portion, for transferring the pitch controlling torque originating from the rotor hub to the tip portion of the rotor blade, said torque rod is journaled through the torque rod channel, said torque rod has a hub portion located at the rotor's hub and a distal end located at near the blade tip, said torque rod is rotatable within the rotor blade except at the tip portion of the rotor blade whereby said torque rod's distal end is rigidly affixed to the tip portion of the rotor blade, pitch-control arm in mechanical connection to the hub portion of the torque rod for transferring pitch-controlling torque to the rotor blade tip, and, blade-twisting servo means firmly attached to the hub portion of the torque rod for twisting the root portion of the rotor blade with respect to the tip portion of the blade, thereby changing the root-to-tip twist of the rotor blade in response to various flight modes and flight conditions, in a range of blade twist from a low degree of blade twist in an autorotation mode to a high degree of blade twist in a horizontal cruising flight mode.

14. The VTOL airplane of claim 1 wherein a prop-rotor system for use in the VTOL-capable airplane having said prop-rotor system that is tiltable from a vertical orientation for providing vertical lift in a VTOL mode to a horizontal orientation for producing horizontal thrust for an efficient horizontal cruise mode, the combination comprising:

a plurality of elongated rotor blade radially arranged around a rotational axis of said prop-rotor, said rotor blades rotate in a plane forming a rotor disc, said rotor blade having a tip portion, a mid portion and a root portion, each of said portion is of airfoil shape having a chord line forming an angle with the plane of the rotor disc defining a pitch angle at a particular spanwise location, said rotor blade further having variation in the pitch angles in a gradient fashion from the tip portion toward the root portion whereas said variation in the pitch angles defines a degree of blade twist from root to tip, thereby positioning each portion of the rotor blade at an optimized angle of incidence with respect to a resultant airflow direction at any given spanwise location for improvement in rotor efficiency at a given mode of operation of the VTOL-capable airplane, means for varying the degree of blade twist of said rotor blade, thereby optimizing efficiency of the prop-rotor in both VTOL and horizontal cruising modes of the airplane, a rotor hub for holding the rotor blades, and, means for changing the pitch angles of all spanwise locations in the rotor blade at once, also referred to as collective pitch and cyclical pitch control as in helicopter practice, for controlling vertical climb rate, lateral acceleration, and forward speed of the VTOL-capable airplane, said pitch changing means generates a significant amount of pitch-controlling torque around a spanwise pitching axis of the blade.

15. The prop-rotor system of claim 14 wherein the means for varying the degree of blade twist of the rotor blade further comprises:

said rotor blade having a sufficient degree of flexibility allowing said rotor blade to be twistable a significant number of degree from root to tip without damage, said rotor blade further having a torque rod channel formed within and traversing along the rotor blade's spanwise pitching axis, a torque rod attached to the rotor hub, said torque rod extends from the rotor hub to the blade tip portion, for transferring the pitch-controlling torque originating from the rotor hub to the tip portion of the rotor blade, said torque rod is journaled through the torque-rod channel, said torque rod has a hub portion located at the rotor's hub and a distal end located at near the blade tip, said torque rod is rotatable within the rotor blade except at the tip portion of the rotor blade whereby said torque rod's distal end is rigidly affixed to the tip portion of the rotor blade, pitch control arm and linkage in mechanical connection to the hub portion of the torque rod for transferring pitch-controlling torque to the rotor blade tip, and, blade-twisting servo means firmly attached to the hub portion of the torque rod for twisting the root portion of the rotor blade with respect to the tip portion of the blade, thereby changing the root-to-tip twist of the rotor blade in response to various flight modes and flight conditions, in a range of maximum blade twist from a low degree of blade twist in an autorotation mode to a high degree of blade twist in a horizontal cruising flight mode.

16. The prop-rotor system of claim 15 wherein the rotor blade is shaped at rest with the degree of blade twist being approximately one half of the maximum degree of blade twist range, thus educing the flexibility required of the rotor blade and thereby making the blade more torsionally rigid at the tip.

17. The prop-rotor system of claim 15 wherein the blade twisting servo means further comprising:

an electric motor having a rotatable core, gear reduction means in mechanical connection to said electric motor's rotatable core for magnifying output torque of said electric motor, said gear reduction means' output torque is transferred via a pinion gear, and, a bevel gear disc having a hub facing side and a rotor-blade facing side, said bevel gear disc is mounted co-axially with the pitching axis of the rotor blade, said bevel gear disc is meshed with the pinion gear from said gear reduction means whereby rotational torque is further magnified, said bevel gear disc is further in mechanical connection to the root portion of the rotor blade, whereby rotational torque from said bevel gear disc is transferred to the rotor blade's root portion for twisting the rotor blade root portion with respect to the rotor blade's tip portion.

18. The prop-rotor system of claim 17 further comprising a rotatable-core brake means for arresting free movement of the rotatable core of the electric motor, said core brake means is electrically de-activatable thereby allowing said rotatable core to provide motive power to said blade-twisting servo means upon receiving controlling signal.

19. The prop-rotor system of claim 15 wherein each individual rotor blade has its root portion pivotably mounted to the rotor hub, allowing each rotor blade to pivot up and down freely in a plane perpendicular to the rotor disc, each rotor blade is pivotable independently of the other rotor blade(s) without incurring spanwise bending moment, thereby eliminating bending stress on the prop-rotor blade which can interfere with the variable twist mechanism, and preventing excessive force to the pitch control linkage by preventing the rotor blade from bending away from the plane of rotation.

20. The prop-rotor system of claim 19 wherein an under-slung rotor structure is used, said rotor structure having two rotor blades driven by a rotor shaft, comprising of a hub mounted on the rotor shaft for rotation by it and including a teeter hinge have a hinge axis passing perpendicularly through the axis of the rotor shaft to provide tilting movement of said hub relative to the rotor shaft about the axis of said teeter hinge, and further including two coning hinges having axes parallel to the axis of the teeter hinge but located below it and offset from the axis of the rotor shaft for mounting the rotor blades to the hub so as to provide independent substantially unopposed coning movement of each rotor blade relative to said hub so as to balance the aerodynamic forces on each blade with the centrifugal forces on each blade, whereby stick shake and hence excessive force on the pitch control linkage is substantially eliminated.

* * * * *